US012686962B2

(12) United States Patent
Lee et al.

(10) Patent No.: US 12,686,962 B2
(45) Date of Patent: Jul. 21, 2026

(54) FILTER APPARATUS AND CLOTHES TREATING APPARATUS HAVING THE SAME

(71) Applicant: SAMSUNG ELECTRONICS CO., LTD., Suwon-si (KR)

(72) Inventors: Kanghyun Lee, Suwon-si (KR); Dongpil Seo, Suwon-si (KR); Jaebok Lee, Suwon-si (KR); Youngjin Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 367 days.

(21) Appl. No.: 18/210,811

(22) Filed: Jun. 16, 2023

(65) Prior Publication Data

US 2024/0052546 A1     Feb. 15, 2024

Related U.S. Application Data

(63) Continuation of application No. PCT/KR2023/007134, filed on May 25, 2023.

(30) Foreign Application Priority Data

Aug. 9, 2022    (KR) ........................ 10-2022-0099534
Dec. 22, 2022    (KR) ........................ 10-2022-0182344

(51) Int. Cl.
  *B01D 35/02*      (2006.01)
  *B01D 29/23*      (2006.01)
      (Continued)

(52) U.S. Cl.
  CPC ............. *D06F 39/10* (2013.01); *B01D 29/23* (2013.01); *B01D 29/605* (2013.01);
      (Continued)

(58) Field of Classification Search
  CPC .. B01D 29/23; B01D 29/605; B01D 29/6476; B01D 29/60; B01D 29/64; B01D 29/03;
      (Continued)

(56) References Cited

U.S. PATENT DOCUMENTS 8,707,973 B2     4/2014 Yoon et al.
9,642,510 B2     5/2017 Yoon et al.
      (Continued)

FOREIGN PATENT DOCUMENTS

CN       103261508 A     8/2013
CN       105463791 A     4/2016
      (Continued)

OTHER PUBLICATIONS

International Search Report dated Sep. 14, 2023 in International Patent Application No. PCT/KR2023/007134.
      (Continued)

*Primary Examiner* — Akash K Varma
(74) *Attorney, Agent, or Firm* — STAAS & HALSEY LLP

(57) ABSTRACT

A filter apparatus positionable outside a washing machine and connectable to a drain device of the washing machine, the filter apparatus including a filter case including a case inlet a case outlet; a filter detachably installable inside the filter case, the filter through which water flowing from the case inlet to the case outlet passes; a sensor to detect water entered into the filter apparatus from the drain device and to produce a corresponding signal; and a filter cleaning device to clean the filter in accordance with the signal produced by the sensor.

14 Claims, 26 Drawing Sheets

(51) Int. Cl.

| | |
|---|---|
| *B01D 29/60* | (2006.01) |
| *B01D 29/64* | (2006.01) |
| *B01D 35/143* | (2006.01) |
| *D06F 39/10* | (2006.01) |

(52) U.S. Cl.
CPC ......... *B01D 29/6476* (2013.01); *B01D 35/02* (2013.01); *B01D 35/143* (2013.01); *B01D 2201/08* (2013.01); *B01D 2201/282* (2013.01)

(58) Field of Classification Search
CPC ...... B01D 35/02; B01D 35/143; B01D 35/16; B01D 2201/08; B01D 2201/282; C02F 1/52; D06F 39/10; D06F 39/08; D06F 34/20; D06F 34/14; D06F 2103/14; D06F 2105/34; D06F 33/02; D06F 35/00
USPC ........................................................ 210/107
See application file for complete search history.

(56) References Cited

U.S. PATENT DOCUMENTS

| | | | |
|---|---|---|---|
| 11,035,073 B2 | 6/2021 | Bocchino et al. | |
| 2006/0060512 A1 | 3/2006 | Astle et al. | |
| 2013/0019899 A1* | 1/2013 | Yoon ................... | A47L 15/4208 |
| | | | 134/10 |
| 2018/0202092 A1 | 7/2018 | Li et al. | |
| 2021/0238795 A1 | 8/2021 | Bocchino et al. | |

FOREIGN PATENT DOCUMENTS

| | | | | |
|---|---|---|---|---|
| CN | 111655923 A | 9/2020 | | |
| CN | 114075750 A | 2/2022 | | |
| CN | 114622389 A | 6/2022 | | |
| JP | 2011-62332 A | 3/2011 | | |
| JP | 4905443 B2 | 3/2012 | | |
| KR | 1998-067492 | 10/1998 | | |
| KR | 10-0432698 B1 | 9/2004 | | |
| KR | 20-2009-0009130 U | 9/2009 | | |
| KR | 10-1645040 B1 | 8/2016 | | |
| KR | 10-1669282 B1 | 10/2016 | | |
| KR | 10-2018-0010261 | 1/2018 | | |
| KR | 10-2046694 | 11/2019 | | |
| WO | WO 2020/251512 A2 * | 12/2020 | ............. | D06F 39/10 |
| WO | WO 2021/165850 A1 * | 8/2021 | ............. | B01D 29/03 |

OTHER PUBLICATIONS

PCT/ISA/237 dated Sep. 14, 2023 in International Patent Application No. PCT/KR2023/007134.
Extended European Search Report dated Oct. 6, 2025 for European Application No. 23852688.3.

* cited by examiner

FILTER APPARATUS AND CLOTHES TREATING APPARATUS HAVING THE SAME

CROSS-REFERENCE TO RELATED APPLICATION

This application is a continuation application under 35 U.S.C. § 111 (a) of international Application No. PCT/KR2023/007134, filed on May 25, 2023, which claims priority to Korean Patent Application No. 10-2022-0099534, filed on Aug. 9, 2022, and Korean Patent Application No. 10-2022-0182344, filed on Dec. 22, 2022, the disclosures of which are incorporated by reference herein in their entireties.

BACKGROUND

1. Field

The disclosure relates to a filter apparatus being connectable to a washing machine, and a clothes treating apparatus having the filter apparatus.

2. Description of Related Art

A washing machine is an apparatus for washing laundry put inside of the tub through friction by stirring the laundry together with water and a detergent by a driving force of a driving motor.

Operations that are performed by the washing machine include, regardless of the type of the washing machine, a washing operation for washing laundry put inside of the tub by supplying a detergent and water to the tub and rotating the drum, a rinsing operation for rinsing the laundry by supplying water to the tub and rotating the drum, and a dehydrating operation for dehydrating water of the laundry by discharging water from the tub and rotating the drum.

The washing machine includes a drain device configured to discharge water stored in the tub to the outside of the washing machine while the washing operation, the rinsing operation, and/or the dehydrating operation is performed. The drain device may be configured to return water discharged from the tub to the tub while the washing operation and/or the rinsing operation is performed.

SUMMARY

Aspects of embodiments of the disclosure will be set forth in part in the description which follows and, in part, will be apparent from the description, or may be learned by practice of the presented embodiments.

According to an embodiment of the disclosure, a filter apparatus is positionable outside a washing machine and connectable to a drain device of the washing machine, the filter apparatus including a filter case including a case inlet and a case outlet; a filter detachably installable inside the filter case, the filter through which water flowing from the case inlet to the case outlet passes; a sensor configured to detect water entered into the filter apparatus from the drain device and to produce a corresponding signal; and a filter cleaning device configured to clean the filter in accordance with the signal produced by the sensor.

According to an embodiment of the disclosure, the filter apparatus further includes a controller configured to control an operation of the filter cleaning device in accordance with the signal produced by the sensor.

According to an embodiment of the disclosure, the controller is configured to operate the filter cleaning device based on a detection of a preset condition in accordance with the signal produced by the sensor.

According to an embodiment of the disclosure, the controller is configured to stop operating the filter cleaning device based on a detection of a preset condition in accordance with the signal produced by the sensor.

According to an embodiment of the disclosure, the preset condition includes a water level in the filter case being equal to or higher than a height of a lowest end of the filter while the filter is installed inside the filter case.

According to an embodiment of the disclosure, the filter case includes a first space in which the filter is installable, and a second space positioned below the first space to accommodate water received through the case inlet and flowing toward the first space.

According to an embodiment of the disclosure, the sensor is configured to detect at least one of water passing through the case inlet or water accommodated in the second space.

According to an embodiment of the disclosure, the filter cleaning device includes a cleaning driver including a cleaning motor, and a cleaning member configured to be rotatable in contact with a surface of the filter through which foreign materials are filtered while the filter is installed inside the filter case, wherein the cleaning driver is configured to drive rotation of the cleaning member with power generated by the cleaning motor.

According to an embodiment of the disclosure, an external diameter of the cleaning member is greater than an internal diameter of the filter.

According to an embodiment of the disclosure, the sensor is mounted on an outer surface of the filter case, corresponding to the second space, and configured to detect water accommodated in the second space.

According to an embodiment of the disclosure, the sensor includes a float configured to float in water received through the case inlet, at least one portion of the float being positioned in the second space.

According to an embodiment of the disclosure, the sensor includes a rotating body positioned in the case inlet and configured to be rotated by water passing through the case inlet.

According to an embodiment of the disclosure, the sensor includes a first electrode portion positioned in the case inlet, and a second electrode portion spaced from the first electrode portion, and the sensor is configured to detect conduction between the first electrode portion and the second electrode portion.

According to an embodiment of the disclosure, the sensor includes a first electrode portion positioned in the second space, and a second electrode portion spaced from the first electrode portion, and the sensor is configured to detect conduction between the first electrode portion and the second electrode portion.

According to an embodiment of the disclosure, the filter apparatus further includes a connecting tube configured to receive water from the filter case into the connecting tube, wherein a first end of the connecting tube communicates with the filter case, a second end of the connecting tube is connected to the sensor, and the sensor is configured to detect a change of internal pressure of the connecting tube.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
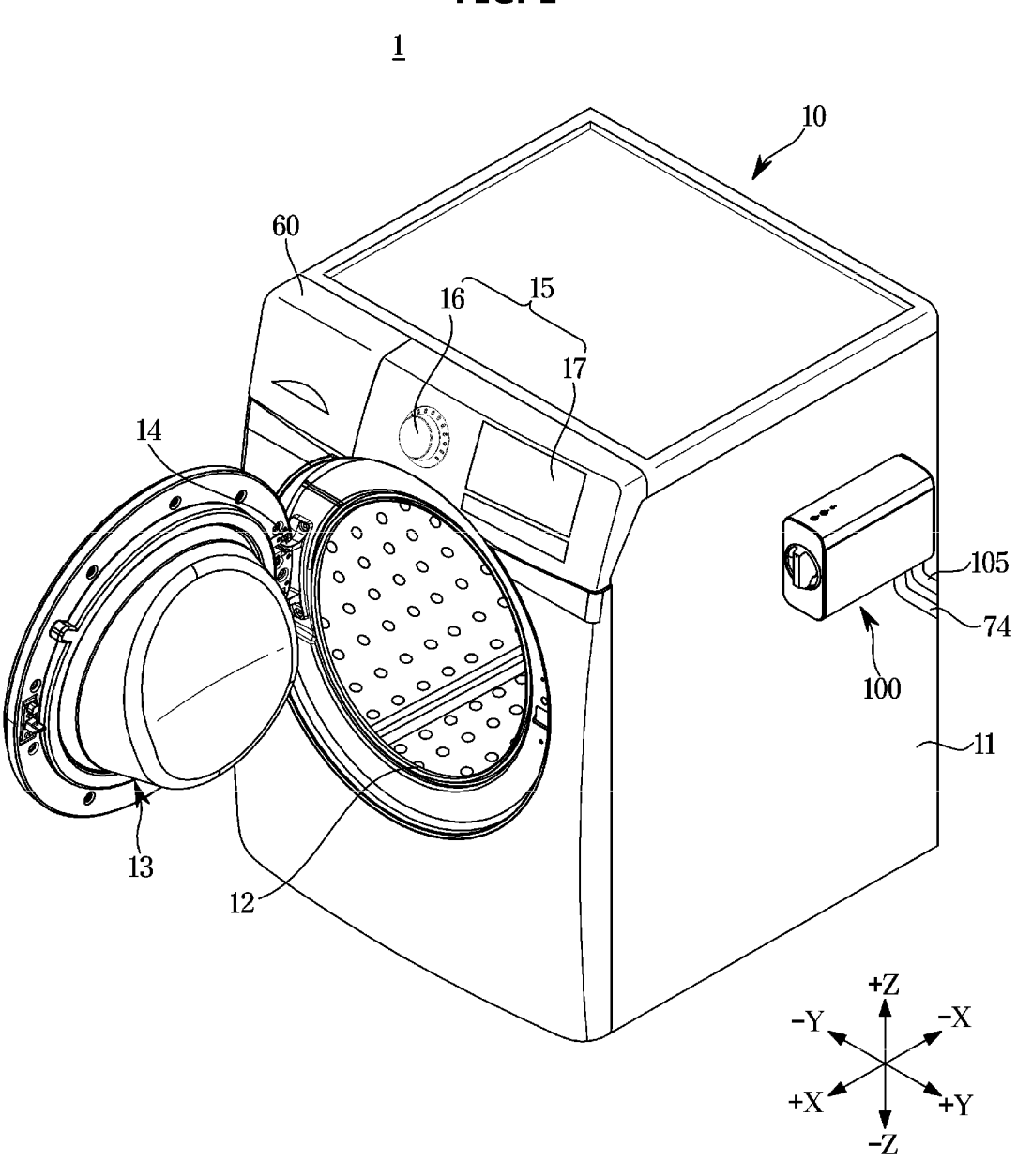
FIG. 1 shows a clothes treating apparatus according to an embodiment of the disclosure.

It should be understood that various embodiments of the present document and the terms used therein are not intended to limit the techniques described herein to specific embodiments, but rather to include various modifications, equivalents, and/or alternatives of the embodiments.

In connection with the description of the drawings, similar reference numerals may be used for similar or related components.

It is to be understood that a singular form of a noun corresponding to an item may include a single item or a plurality of items, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

The term "and/or" includes any and all combinations of one or more of associated listed items.

As used herein, such terms as "1st" and "2nd," or "first" and "second" may be used to simply distinguish a corresponding component from another, and does not limit the components in other aspect (for example, importance or order).

It is to be understood that if a certain component (for example, a first component) is referred to, with or without the term "operatively" or "communicatively", as "coupled with," "coupled to," "connected with," or "connected to" another component (for example, a second component), it means that the component may be coupled with the other component directly (for example, wiredly), wirelessly, or via a third element.

It is to be understood that the terms such as "including" or "having," etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

It is to be understood that if a certain component is referred to as being "coupled with," "coupled to," "supported on" or "in contact with" another component, it means that the component may be coupled with the other component directly or indirectly via a third component.

It will also be understood that when a certain component is referred to as being "on" or "over" another component, it can be directly on the other component or intervening components may also be present.

A washing machine according to various embodiments of the disclosure may perform a washing operation, a rinsing operation, a drain operation, and a dehydrating operation. The washing machine may be a washing machine with a drying function, which is capable of drying laundry dehydrated. The washing machine may be an example of a clothes treating apparatus. The clothes treating apparatus may include an apparatus for washing clothes (objects to be washed and objects to be dried), an apparatus for drying clothes, and an apparatus for washing and drying clothes.

The washing machine according to various embodiments of the disclosure may include a top-loading washing machine, wherein an inlet through which laundry is put into or taken out of the top-loading washing machine is provided upward, or a front-loading washing machine, wherein an inlet through which laundry is put into or taken out of the front-loading washing machine is provided forward. The washing machine according to various embodiments of the disclosure may include another loading type of washing machine, other than the top-loading washing machine and the front-loading washing machine.

The top-loading washing machine may wash laundry with water streams generated by a rotating body such as a pulsator. The front-loading washing machine may wash laundry by rotating a drum to repeatedly raise and drop the laundry. The front-loading washing machine may include a lift for raising laundry. The front-loading washing machine may include a washing machine with a drying function, which is capable of drying laundry accommodated in a drum. The washing machine with the drying function may include a heating device for high-temperature air. The washing machine with the drying function may further include a condensation device for dry air. For example, the washing machine with the drying function may include a heat pump. The washing machine according to various embodiments of the disclosure may include a washing machine using another washing method in addition to the above-described washing methods.

Embodiments of the disclosure may provide a filter apparatus being easily manageable and a clothes treating apparatus having the filter apparatus. Embodiments of the disclosure may provide a filter apparatus capable of increasing a replacement cycle of a filter and a clothes treating apparatus having the filter apparatus. Embodiments of the disclosure may provide a filter apparatus capable of cleaning a filter by detecting water received from a washing machine, and a clothes treating apparatus having the filter apparatus.

Technical objects of the disclosure are not limited to those described above, and other technical objects not described herein will also be clearly understood by a person who has a common knowledge in the technical field to which the disclosure pertains from the following detailed description.

Hereinafter, a washing machine according to various embodiments of the disclosure will be described in detail with reference to the accompanying drawings.

Figure 2:
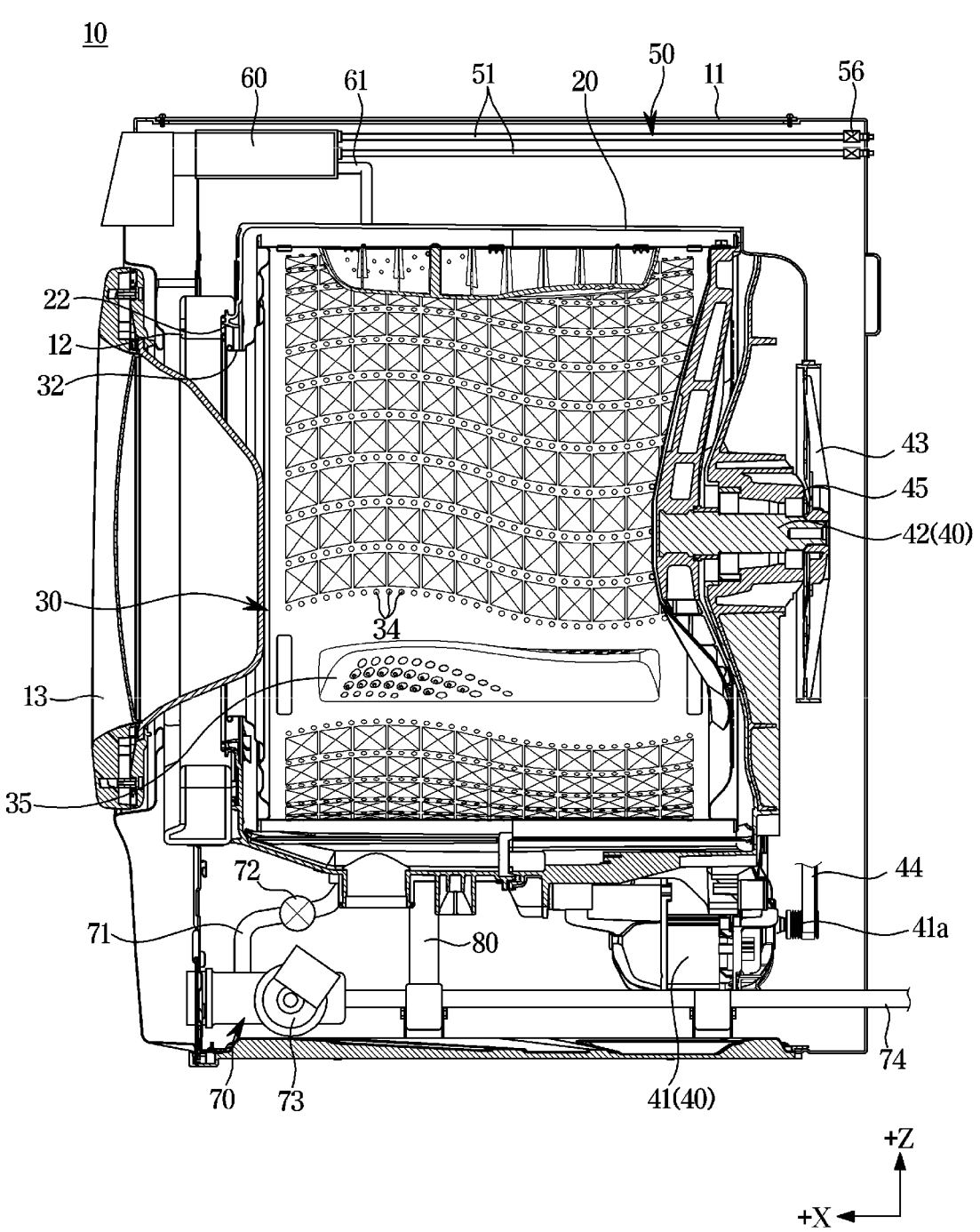
FIG. 2 shows a cross section of the washing machine shown in FIG. 1 according to an embodiment of the disclosure.

FIG. 1 shows a clothes treating apparatus, which in this embodiment is a washing machine, according to an embodiment of the disclosure. FIG. 2 shows a cross section of the washing machine shown in FIG. 1.

As shown in FIGS. 1 and 2, the clothes treating apparatus 1, which in this embodiment is the washing machine, may include a washing machine housing 11 for accommodating various components therein. The washing machine housing 11 may form an appearance of the washing machine 10. The washing machine housing 11 may be in a shape of a box of which a portion opens.

The washing machine housing 11 may include a housing opening 12 allowing an access to inside of a drum 30. The housing opening 12 may open substantially toward a front direction.

The washing machine 10 may include a door 13 for opening or closing the housing opening 12 provided in the washing machine housing 11. The door 13 may be rotatably mounted on the washing machine housing 11 by a hinge 14. At least one portion of the door 13 may be transparent or translucent to show the inside of the washing machine housing 11.

The washing machine 10 may include a tub 20 provided inside the washing machine housing 11 to store water. The tub 20 may be positioned inside the washing machine housing 11. The tub 20 may include a tub opening 22 corresponding to the housing opening 12. The tub opening 22 may open substantially toward the front direction. The tub 20 may be supported inside the washing machine housing 11. The tub 20 may have a substantially cylindrical shape of which one side opens.

The tub 20 may be elastically supported from the washing machine housing 11 by a damper 80. The damper 80 may connect the tub 20 to the washing machine housing 11. While vibrations generated according to a rotation of the drum 30 are transferred to the tub 20 and/or the washing machine housing 11, the damper 80 may absorb vibration energy between the tub 20 and the washing machine housing 11 to attenuate the vibrations.

The washing machine 10 may include the drum 30 accommodating laundry. The drum 30 may be rotatably provided inside the tub 20. The drum 30 may perform washing, rinsing, and/or dehydrating while rotating inside the tub 20. The drum 30 may include a through hole 34 that connects an inside space of the drum 30 to an inside space of the tub 20. The drum 30 may have a substantially cylindrical shape of which one side opens. On an inner circumferential surface of the drum 30, at least one lifter 35 may be installed to raise and drop laundry according to a rotation of the drum 30.

The drum 30 may include a drum opening 32 corresponding to the housing opening 12 and the tub opening 22. Laundry may be put into or taken out of the drum 30 through the housing opening 12, the tub opening 22, and the drum opening 32.

The washing machine 10 may include a washing machine driver 40 configured to rotate the drum 30. The washing machine driver 40 may include a driving motor 41, and a rotating shaft 42 for transferring a driving force generated in the driving motor 41 to the drum 30. The rotating shaft 42 may penetrate the tub 20 and be connected to the drum 30.

Washing machines may be classified into a direct driving type in which the rotating shaft 42 is connected directly to the driving motor 41 to rotate the drum 30, and an indirect driving type in which a pulley 43 is connected between the driving motor 41 and the rotating shaft 42 to drive the drum 30.

The washing machine 10 according to an embodiment of the disclosure may be the indirect driving type, although not limited thereto. However, the washing machine 10 may be the direct driving type.

One end of the rotating shaft 42 may be connected to the drum 30, and another end may be connected to the pulley 43 to receive power from the driving motor 41. At the rotating shaft 42 of the driving motor 41, a motor pulley 41a may be formed. A driving belt 44 may be provided between the motor pulley 41a and the pulley 43 such that the rotating shaft 42 is driven by the driving belt 44.

In the rear portion of the tub 20, a bearing housing 45 may be installed to rotatably support the rotating shaft 42. The bearing housing 45 may be made of an aluminum alloy. The bearing housing 45 may be inserted into the rear portion of the tub 20 upon injection-molding of the tub 20.

The washing machine driver 40 may rotate the drum 30 forward or backward to perform a washing operation, a rinsing operation, and/or a dehydrating operation or a drying operation.

The washing machine 10 may include a water supply device 50. The water supply device 50 may supply water to the tub 20. The water supply device 50 may be positioned above the tub 20. The water supply device 50 may include a water supply tube 51, and a water supply valve 56 provided in the water supply tube 51. The water supply tube 51 may be connected to an external water supply source. The water supply tube 51 may extend to a detergent supply device 60 and/or the tub 20 from the external water supply source. Water may be supplied to the tub 20 via the detergent supply device 60. Water may be supplied to the tub 20 not via the detergent supply device 60.

The water supply valve 56 may open or close the water supply tube 51 in response to an electrical signal from a controller 90. The water supply valve 56 may allow or block supply of water from the external water supply source to the tub 20. The water supply valve 56 may include, for example, a solenoid valve that is opened or closed in response to an electrical signal.

The washing machine 10 may include the detergent supply device 60 configured to supply a detergent to the tub 20. The detergent supply device 60 may supply a detergent to the inside of the tub 20 during a water supply process. Water supplied through the water supply tube 51 may be mixed with a detergent via the detergent supply device 60. The water mixed with the detergent may be supplied to the inside of the tub 20. The detergent may include a conditioner for dryer, a deodorant, a sterilizer, or an air freshener, as well as a washing detergent. The detergent supply device 60 may be connected to the tub 20 through a connecting tube 61.

The washing machine 10 may include a drain device 70. The drain device 70 may discharge water accommodated in the tub 20 to outside. The drain device 70 may include a drain pump 73 for discharging water accommodated in the tub 20 to outside of the washing machine housing 11, a connecting hose 71 connecting the drain pump 73 to the tub 20 such that water stored in the tub 20 flows to the drain pump 73, and a drain hose 74 for guiding water pumped by the drain pump 73 to the outside of the washing machine housing 11. The drain device 70 may include a drain valve 72 provided in the connecting hose 71 to open or close the connecting hose 71.

The washing machine 10 may provide a user interface 15 for interactions with a user.

The washing machine 10 may include at least one user interface 15. The user interface 15 may include at least one input interface 16 and/or at least one output interface 17.

The clothes treating apparatus 1 may include a filter apparatus 100 that is connectable to the drain device 70 of the washing machine 10. The filter apparatus 100 may be positioned outside the washing machine 10. The filter apparatus 100 may filter foreign materials from water discharged from the washing machine 10. The filter apparatus 100 may filter foreign materials having smaller sizes than those of foreign materials that are capable of being filtered in the washing machine 10. For example, the filter apparatus 100 may filter foreign materials having smaller sizes than those of foreign materials that are capable of being filtered in the drain device 70 of the washing machine 10.

Figure 3:
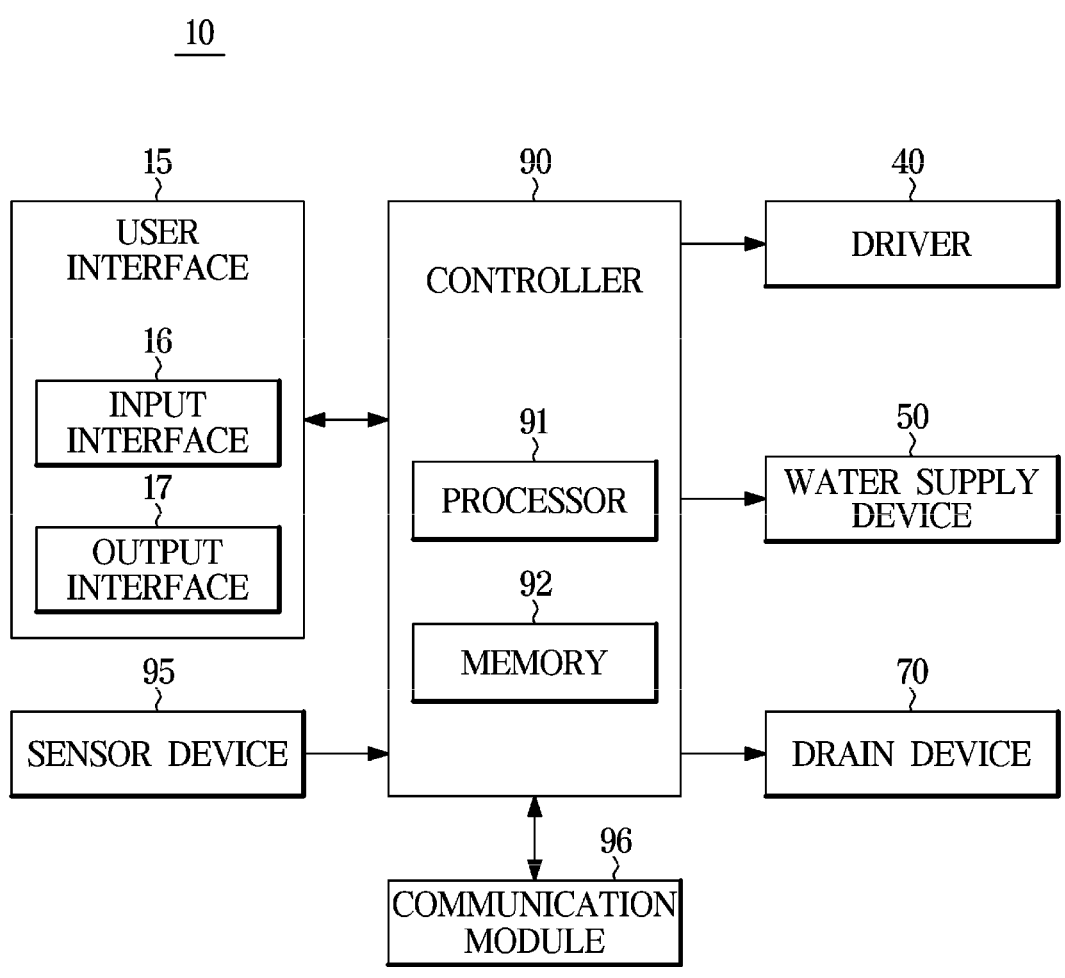
FIG. 3 is a control block diagram of a washing machine according to an embodiment of the disclosure.

FIG. 3 is a control block diagram of a washing machine according to an embodiment of the disclosure.

According to an embodiment of the disclosure, the washing machine 10 may include the user interface 15, the driver 40, the water supply device 50, the drain device 70, a sensor device 95, a communication module 96, and the controller 90.

The user interface 15 may provide a user interface for interactions with a user.

For example, the user interface 15 may include at least one input interface 16. For example, the user interface 15 may include at least one output interface 17.

The at least one input interface 16 may convert sensory information received from a user into an electrical signal.

The at least one input interface 16 may include a power button, an operation button, a course selection dial (or a course selection button), and a washing/rinsing/dehydrating setting button. The at least one input interface 16 may include, for example, a tact switch, a push switch, a slide switch, a toggle switch, a micro switch, a touch switch, a touch pad, a touch screen, a jog dial, and/or a microphone, etc.

The at least one output interface 17 may generate sensory information and transfer various data related to an operation of the washing machine 10 to a user.

For example, the at least one output interface 17 may transfer information related to a washing course and an operation time of the washing machine 10 or a washing setting/rinsing setting/dehydrating setting to a user. Information related to an operation of the washing machine 10 may be output through a screen, an indicator, a voice, etc. The at least one output interface 17 may include, for example, a Liquid Crystal Display (LCD) panel, a Light Emitting Diode (LED) panel, a speaker, etc.

The driver 40 may include the driving motor 41 for providing a driving force for rotating the drum 30. The driver 40 may operate based on a control signal from the controller 90.

The water supply device 50 may include the water supply valve 56 for opening or closing the water supply tube 51 extending from the external water supply source to the detergent supply device 60 and/or the tub 20. The water supply valve 56 may be opened or closed based on a control signal from the controller 90.

The drain device 70 may include the drain pump 73 for discharging water stored in the tub 20 to the outside of the washing machine housing 11. The drain pump 73 may operate based on a control signal from the controller 90.

The sensor device 95 may include at least one sensor for obtaining information related to an operation state of the washing machine 10.

For example, the sensor device 95 may include at least one among a water level sensor for detecting a water level of the tub 20, a sensor for detecting an operation state of the driver 40, a flow sensor for detecting a rate of flow of water entered into the tub 20 through the water supply device 50, or a sensor for detecting an operation state of the drain device 70.

The sensor for detecting the operation state of the driver 40 may include, for example, a current sensor for measuring driving current applied to the driving motor 41, although not limited thereto.

The sensor for detecting the operation state of the drain device 70 may include, for example, a current sensor for measuring driving current applied to the drain pump 73, although not limited thereto.

The washing machine 10 may include the communication module 96 for communicating with an external device wiredly or wirelessly.

The communication module 96 may include at least one of a short-range wireless communication module or a long-distance wireless communication module.

The communication module 96 may transmit data to an external device (for example, a server, a user device, a home appliance, and/or the filter apparatus 100), or receive data from an external device. For example, the communication module 96 may establish communication with a server and/or a user device and/or a home appliance and transmit/receive various data to/from the server and/or the user device and/or the home appliance.

For this, the communication module 96 may support establishment of a direct (for example, wired) communication channel or a wireless communication channel with an external device, and communications through an established communication channel. According to an embodiment of the disclosure, the communication module 96 may include a wireless communication module (for example, a cellular communication module, a short-range wireless communication module, or a global navigation satellite system (GNSS) communication module) or a wired communication module (for example, a local area network (LAN) communication module or a power line communication module). A corresponding communication module among the communication modules may communicate with an external electronic device through a first network (for example, a short-range wireless communication network, such as Bluetooth, WiFi Direct, or Infrared data association (IrDA)) or a second network (for example, a long-distance wireless communication network, such as a legacy cellular network, a 5th Generation (5G) network, a next-generation communication network, the Internet, or a computer network (for example, a LAN or a wide area network (WAN))). The various kinds of communication modules may be integrated into a single component (for example, a single chip) or implemented with a plurality of separate components (for example, a plurality of chips).

The short-range wireless communication module may include a Bluetooth communication module, a Bluetooth Low Energy (BLE) communication module, a Near Field Communication (NFC) communication module, a Wireless Local Area Network (WLAN; WiFi) communication module, a Zigbee communication module, an IrDA communication module, a Wi-Fi Direct (WFD) communication module, a Ultrawideband (UWB) communication module, an Ant+ communication module, a microwave (uWave) communication module, etc., although not limited thereto.

The long-distance wireless communication module may include a communication module that performs various kinds of long-distance communications, and may include a mobile communicator. The mobile communicator may transmit/receive a wireless signal to/from at least one of a base station, an external terminal, or a server on a mobile communication network.

According to an embodiment of the disclosure, the communication module may communicate with an external device, such as a server, a user device, another home appliance, etc., through a surrounding Access Point (AP). The AP may connect a LAN to which the washing machine 10 or a user device is connected to a WAN to which a server is connected. The washing machine 10 or the user device may be connected to the server through the WAN. The controller 90 may control various components (for example, the driver 40 or the water supply device 50) of the washing machine 10. The controller 90 may control various components of the washing machine 10 to perform at least one operation including water supply, washing, rinsing, and/or dehydrating according to a user input. For example, the controller 90 may control the driving motor 41 to adjust a rotation speed of the drum 30, or the water supply valve 56 of the water supply device 50 to supply water to the tub 20.

The controller 90 may include hardware such as a central processing unit (CPU) or a memory, and software such as a control program. For example, the controller 90 may include at least one memory 92 that stores data in the form of an algorithm or program for controlling operations of components in the washing machine 10, and at least one processor 91 that performs the above-described operations by using the data stored in the at least one memory 92. The memory 92 and the processor 91 may be implemented with separate chips. The processor 91 may include one, two, or more processor chips or one, two, or more processing cores. The memory 92 may include one, two, or more memory chips or one, two, or more memory blocks. Also, the memory 92 and the processor 91 may be implemented with a single chip.

Figure 4:
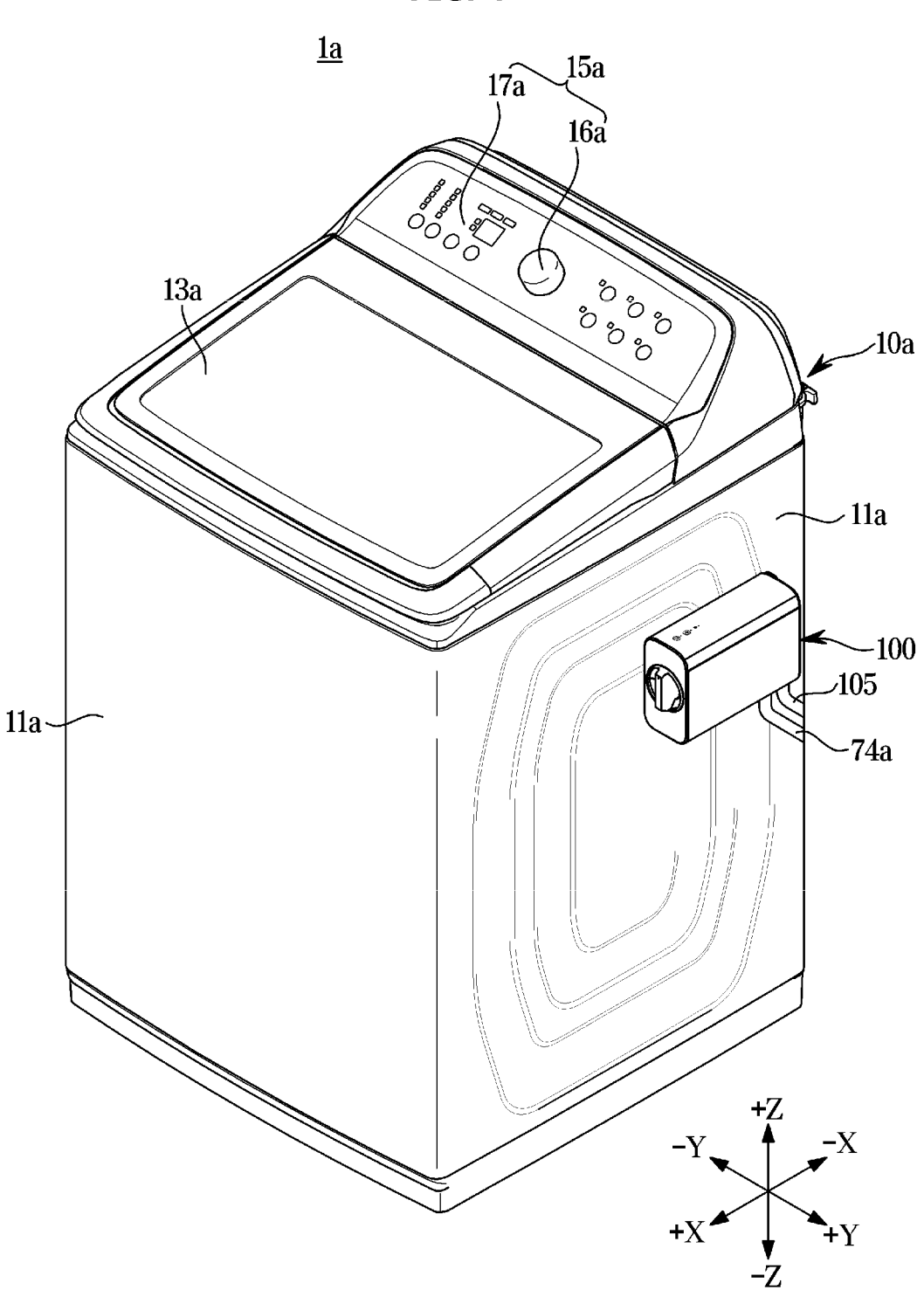
FIG. 4 shows a clothes treating apparatus according to an embodiment of the disclosure.
Figure 5:
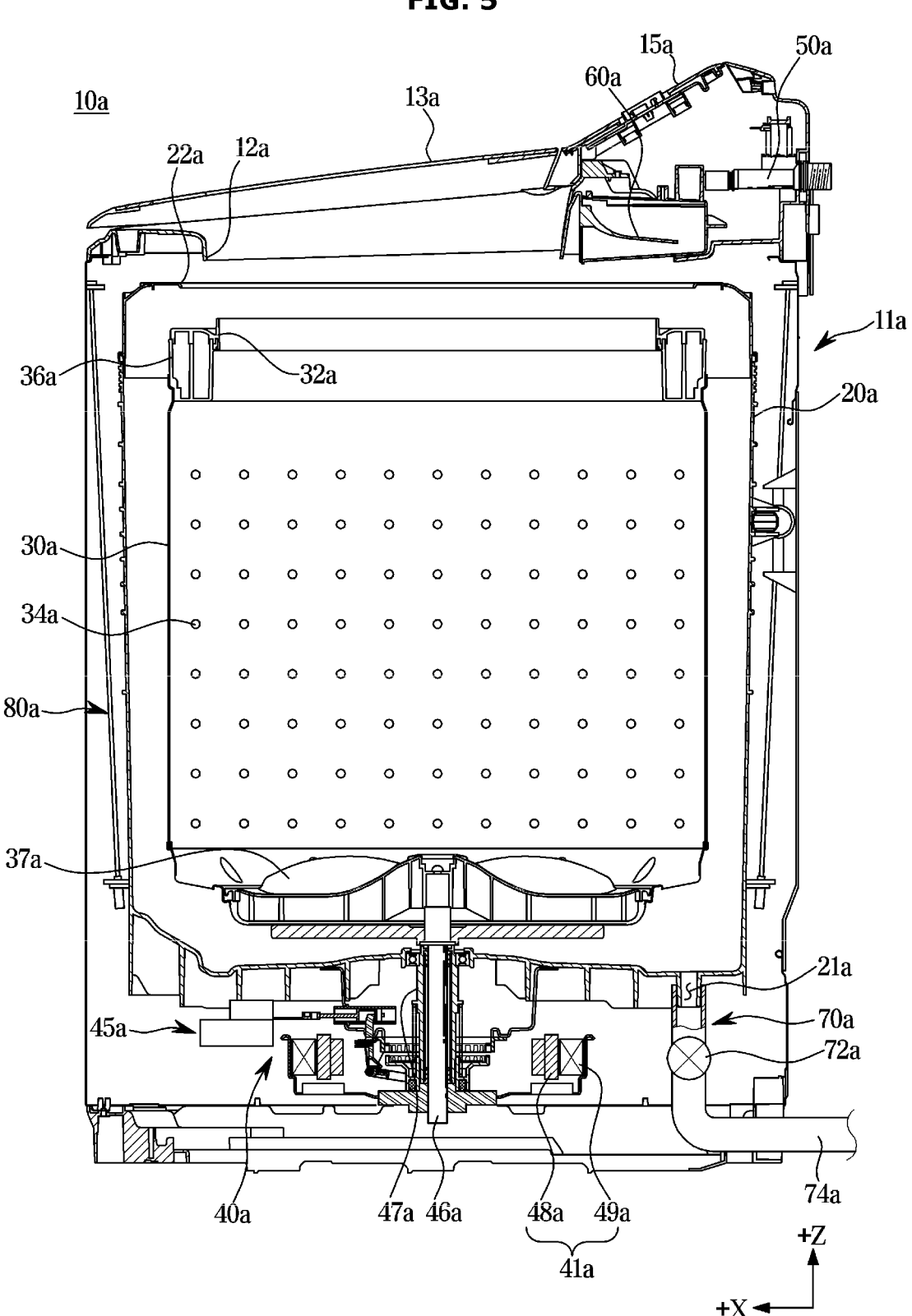
FIG. 5 shows a cross section of the washing machine shown in FIG. 4 according to an embodiment of the disclosure.

FIG. 4 shows a clothes treating apparatus, which in this embodiment is a washing machine, according to an embodiment of the disclosure. FIG. 5 shows a cross section of the washing machine shown in FIG. 4.

As shown in FIGS. 4 and 5, a clothes treating apparatus 1a, which in this embodiment is a washing machine 10a, may include a washing machine housing 11a for accommodating various components therein. The washing machine housing 11a may form an appearance of the washing machine 10a. The washing machine housing 11a may be in a shape of a box of which a portion opens.

The washing machine housing 11a may include a housing opening 12a allowing an access to inside of a drum 30a. The housing opening 12a may open substantially toward the front direction.

The washing machine 10a may include a door 13a for opening or closing the housing opening 12a provided in the washing machine housing 11a. The door 13a may be rotatably mounted on the washing machine housing 11a by a hinge. At least one portion of the door 13a may be transparent or translucent to show the inside of the washing machine housing 11a.

The washing machine 10a may include a tub 20a provided inside the washing machine housing 11a to store water. The tub 20a may be positioned inside the washing machine housing 11a. The tub 20a may include a tub opening 22a corresponding to the housing opening 12a. The tub opening 22a may open substantially upward. The tub 20a may be supported inside the washing machine housing 11a. The tub 20a may have a substantially cylindrical shape of which one side opens.

The tub 20a may be elastically supported from the washing machine housing 11a by a damper 80a. The damper 80a may connect the tub 20a to the washing machine housing 11a. While vibrations generated according to a rotation of the drum 30a are transferred to the tub 20a and/or the washing machine housing 11a, the damper 80a may absorb vibration energy between the tub 20a and the washing machine housing 11a to attenuate the vibrations.

The washing machine 10a may include the drum 30a accommodating laundry. The drum 30a may be rotatably provided inside the tub 20a. The drum 30a may perform washing, rinsing, and/or dehydrating while rotating inside the tub 20a. The drum 30a may include a through hole 34a connecting an inside space of the drum 30a to an inside space of the tub 20a. The drum 30a may have a substantially cylindrical shape of which one side opens.

On an upper portion of the drum 30a, a balancing unit 36a for releasing load imbalance caused by laundry may be installed. The balancing unit 36a may include a housing having a circular channel, and a mass body of a ball or fluid being movable inside the channel, and while the ball or fluid moves according to a rotation of the drum 30a, the load imbalance of the drum 30a may be released.

A pulsator 37a may be rotatably provided on a lower portion of the drum 30a to generate water streams for washing. Laundry may be washed by water streams for washing generated by the pulsator 37a.

The drum 30a may include a drum opening 32a corresponding to the housing opening 12a and the tub opening 22a. Laundry may be put into or taken out of the drum 30a through the housing opening 12a, the tub opening 22a, and the drum opening 32a.

The washing machine 10a may include a washing machine driver 40a configured to rotate the drum 30a and the pulsator 37a. The washing machine driver 40a may include a driving motor 41a, and a shafting for transferring a driving force generated in the driving motor 41 to the drum 30a and the pulsator 37a.

The driving motor 41a may include a stator 48a fixed, and a rotor 49a rotating by electromagnetically interworking with the stator 48a.

The shafting may include a dehydrating shaft 47a for transferring a driving force of the driving motor 41a to the drum 30a, a washing shaft 46a for transferring a driving force of the driving motor 41a to the pulsator 37a, and a clutch device 45a connecting/disconnecting the driving motor 41a to/from the dehydrating shaft 47a.

The dehydrating shaft 47a may have a cavity, and the washing shaft 46a may be provided in the cavity of the dehydrating shaft 47a. The washing shaft 46a may be connected to the rotor 49a of the driving motor 41a, and the dehydrating shaft 47a may be connected to or disconnected from the rotor 49a of the driving motor 41a by the clutch device 45a.

While the clutch device 45a disconnects the dehydrating shaft 47a from the driving motor 41a, power may be transferred only to the washing shaft 46a, and only the pulsator 37a may rotate. While the clutch device 45a connects the dehydrating shaft 47a to the driving motor 41a, power may be transferred to both the dehydrating shaft 47a and the washing shaft 46a, and the drum 30a and the pulsator 37a may rotate simultaneously.

While only the pulsator 37a rotates, water streams for washing may be generated by the rotation of the pulsator 37a, laundry may rotate by the water streams for washing to rub against the drum 30a, and thereby, the laundry may be washed. While the drum 30a and the pulsator 37a rotate simultaneously, laundry accommodated inside the drum 30a may rotate, water may be removed from the laundry by a centrifugal force, and thereby, the laundry may be dehydrated.

The washing machine 10a may include a water supply device 50a. The water supply device 50a may supply water to the tub 20a. The water supply device 50a may be positioned above the tub 20a. The water supply device 50a may include a water supply tube, and a water supply valve provided in the water supply tube. The water supply tube may be connected to an external water supply source. The water supply tube may extend from the external water supply source to a detergent supply device 60a and/or the tub 20a. Water may be supplied to the tub 20a via the detergent supply device 60a. Water may be supplied to the tub 20a not via the detergent supply device 60a.

The water supply valve may open or close the water supply tube in response to an electrical signal from a controller. The water supply valve may allow or block supply of water from the external water supply source to the tub 20. The water supply valve may include, for example, a solenoid valve that is opened or closed in response to an electrical signal.

The washing machine 10a may include the detergent supply device 60a configured to supply a detergent to the tub 20a. The detergent supply device 60a may supply a detergent to the inside of the tub 20a during a water supply process. Water supplied through the water supply tube may be mixed with a detergent via the detergent supply device 60a. The water mixed with the detergent may be supplied to the inside of the tub 20a. The detergent may include a conditioner for dryer, a deodorant, a sterilizer, or an air freshener, as well as a washing detergent.

The washing machine 10a may include a drain device 70a. The drain device 70a may be configured to discharge water accommodated in the tub 20a to the outside. In a lower portion of the tub 20a, a drain opening 21a for draining water stored in the tub 20a to the outside of the tub 20a may be formed. A drain hose 74a may be connected to the drain opening 21a, and a drain valve 72a for opening or closing the drain hose 74a may be provided in the drain hose 74a.

The washing machine 10a may provide a user interface 15a for enabling a user to interact with the washing machine 10a.

The washing machine 10a may include at least one user interface 15a. The user interface 15a may include at least one input interface 16a and/or at least one output interface 17a.

The at least one input interface 16a may convert sensory information received from the user into an electrical signal.

The at least one input interface 16a may include a power button, an operation button, a course selection dial (or a course selection button), and a washing/rinsing/dehydrating setting button. The at least one input interface 16a may include, for example, a tact switch, a push switch, a slide switch, a toggle switch, a micro switch, a touch switch, a touch pad, a touch screen, a jog dial, and/or a microphone, etc.

The at least one output interface 17a may transfer various data related to an operation of the washing machine 10a to the user by generating sensory information.

For example, the at least one output interface 17a may transfer information related to a washing course and an operation time of the washing machine 10a or a washing setting/rinsing setting/dehydrating setting to the user. Information related to an operation of the washing machine 10a may be output through a screen, an indicator, a voice, etc. The at least one output interface 17a may include, for example, a LCD panel, a LED panel, a speaker, etc.

The clothes treating apparatus 1a may include the same filter apparatus 100 as the filter apparatus 100 shown in FIGS. 1 and 2. For example, the filter apparatus 100 according to an embodiment of the disclosure may be connected to a front-loading washing machine or a top-loading washing machine. The filter apparatus 100 may be connectable to the drain device 70a of the washing machine 10a. The filter apparatus 100 may be positioned outside the washing machine 10a. The filter apparatus 100 may filter foreign materials from water discharged from the washing machine 10a. The filter apparatus 100 may filter foreign materials having smaller sizes than those of foreign materials that are filterable in the washing machine 10a. For example, the filter apparatus 100 may filter foreign materials having smaller sizes than those of foreign materials that are filterable in the drain device 70a of the washing machine 10a.

The same control components as those of the washing machine 10 shown in FIG. 3 may be applied to the washing machine 10a of the clothes treating apparatus 1a shown in FIGS. 4 and 5.

Figure 6:
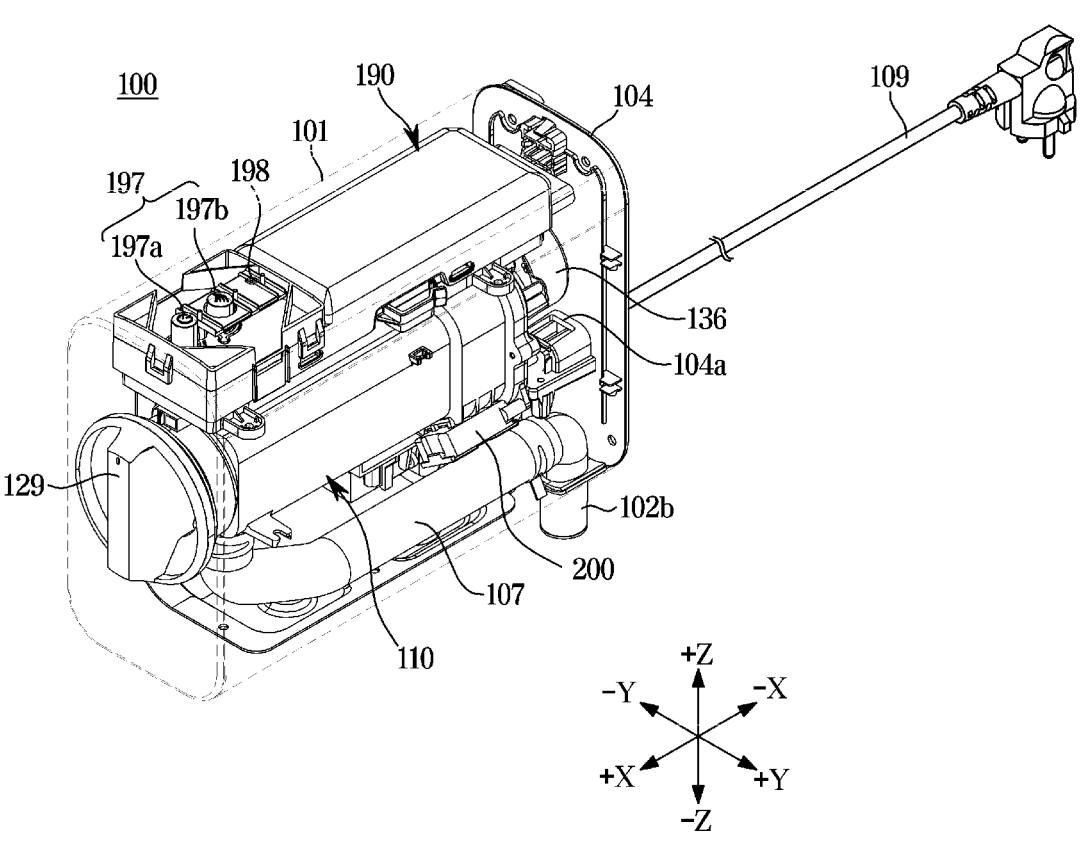
FIG. 6 shows inside of a filter apparatus shown in FIGS. 1 and 3 according to an embodiment of the disclosure.
Figure 7:
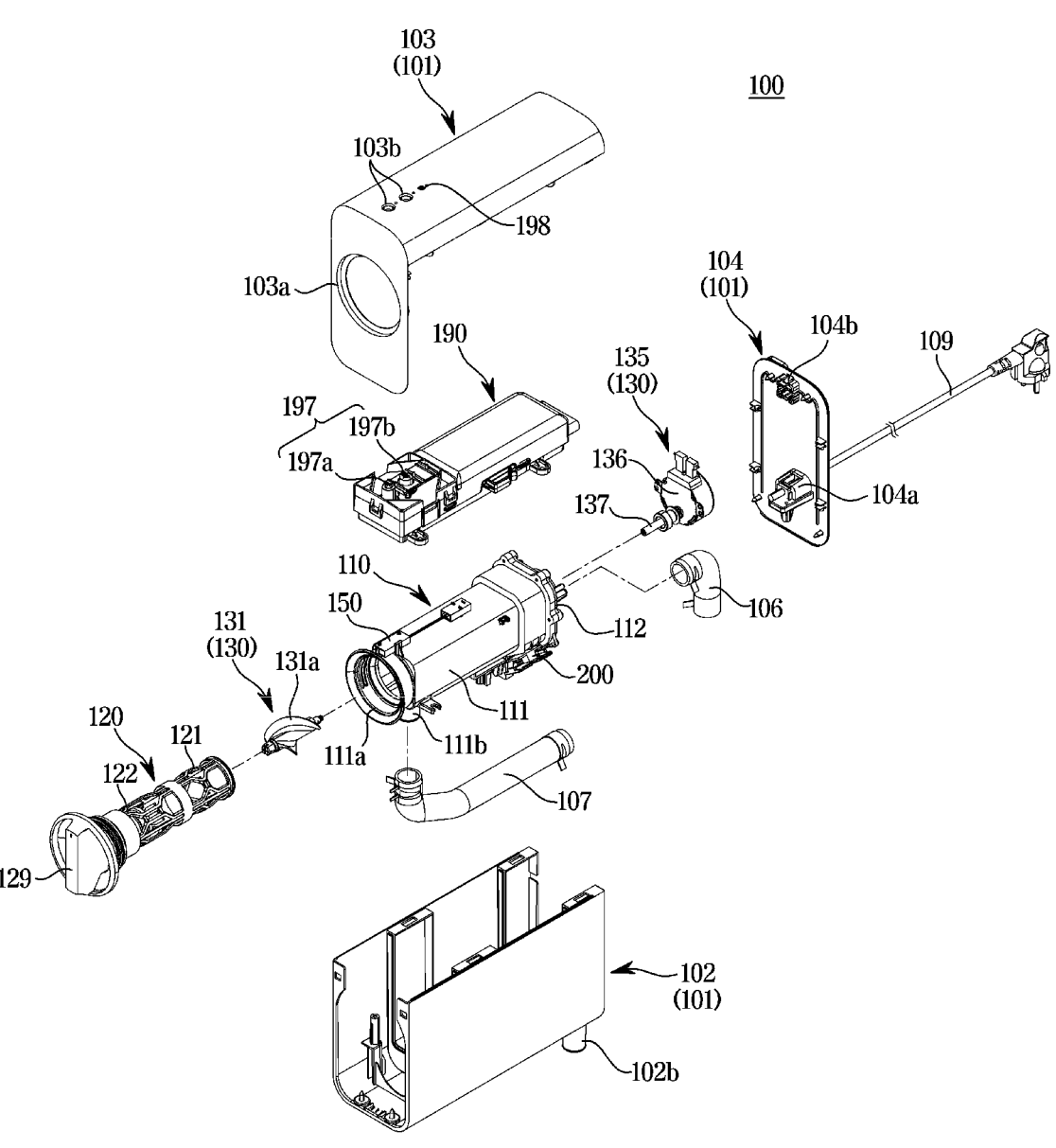
FIG. 7 is an exploded view of the filter apparatus shown in FIG. 6 according to an embodiment of the disclosure.
Figure 8:
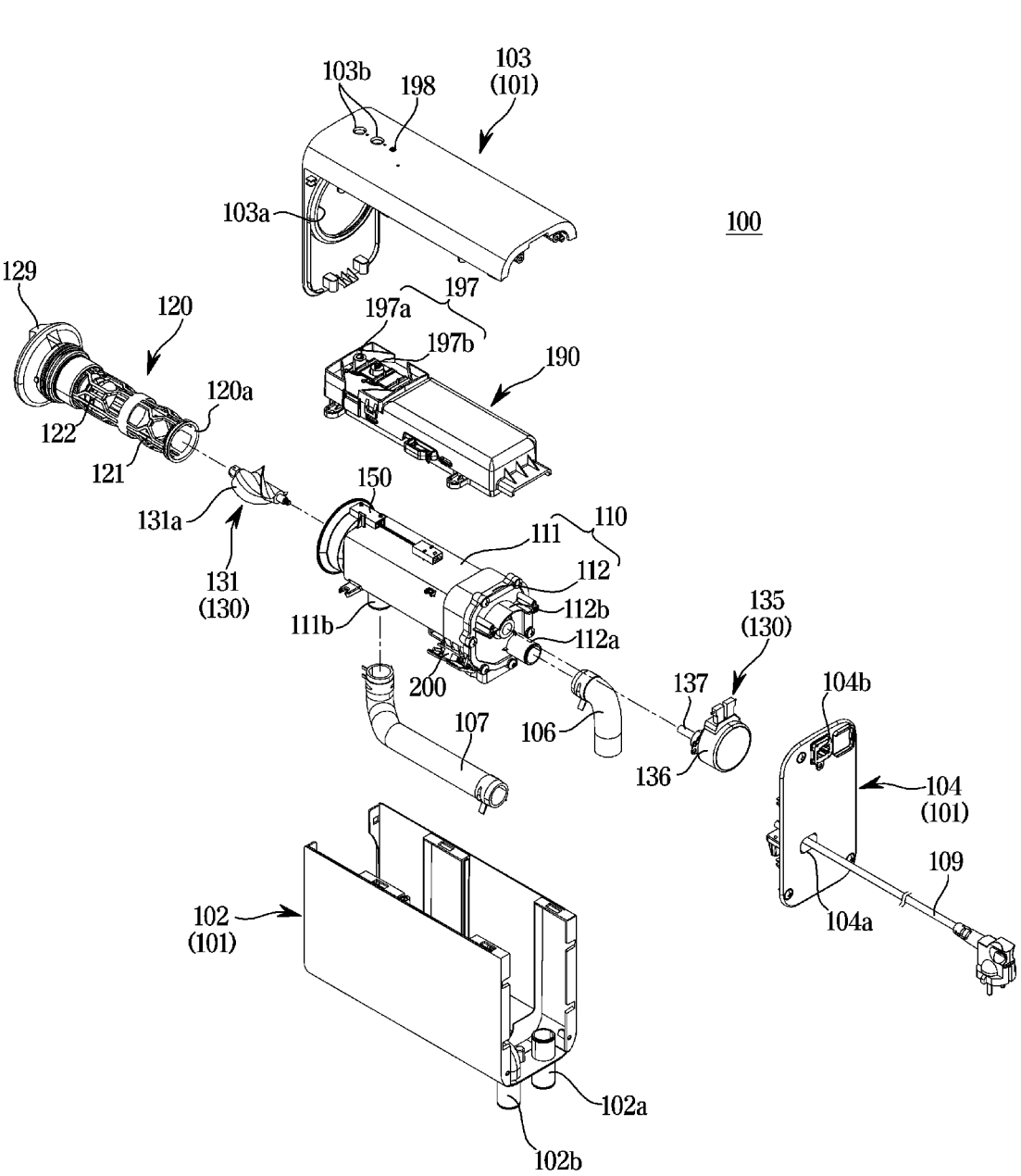
FIG. 8 shows the filter apparatus shown in FIG. 7 in a direction that is different from a direction of FIG. 7 according to an embodiment of the disclosure.
Figure 9:
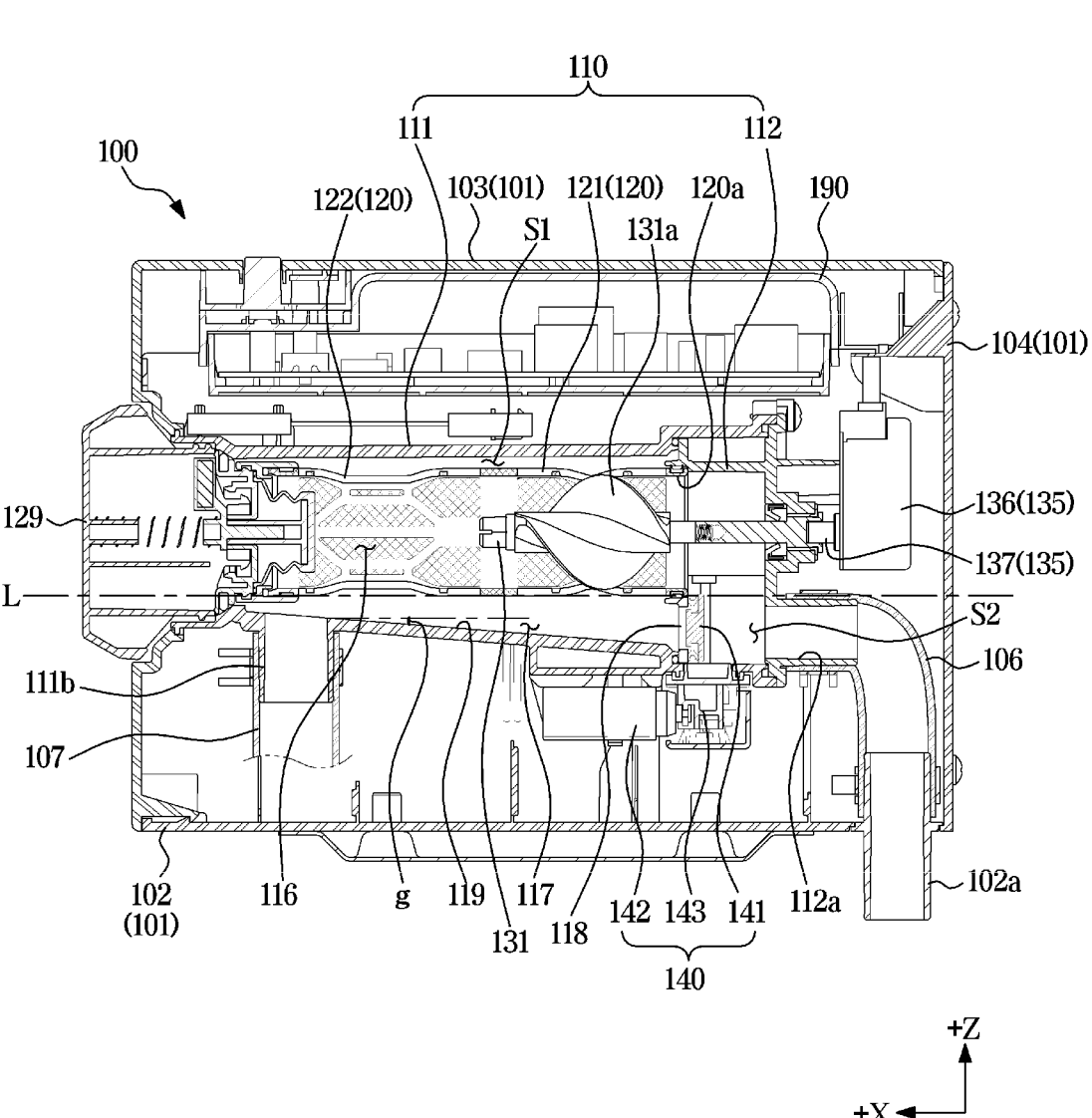
FIG. 9 shows a cross section of the filter apparatus shown in FIG. 6 according to an embodiment of the disclosure.

FIG. 6 shows inside of a filter apparatus shown in FIGS. 1 and 3. FIG. 7 is an exploded view of the filter apparatus shown in FIG. 6. FIG. 8 shows the filter apparatus shown in FIG. 7 in a direction that is different from a direction of FIG. 7. FIG. 9 shows a cross section of the filter apparatus shown in FIG. 6.

Referring to FIGS. 6 to 9, the filter apparatus 100 may include a filter housing 101 for accommodating various components. The filter housing 101 may include a housing body 102, a housing cover 103, and a housing bracket 104. For example, the housing body 102, the housing cover 103, and the housing bracket 104 may be separate components. For example, the housing body 102 and the housing cover 103 may be integrated into one body. For example, the housing body 102 and the housing bracket 104 may be integrated into one body. For example, the housing cover 103 and the housing bracket 104 may be integrated into one body. For example, the housing body 102, the housing cover 103, and the housing bracket 104 may be integrated into one body.

The housing body 102 may form a space for accommodating various components. A cross section of the housing body 102 being perpendicular to an extension direction of a filter 120 accommodated therein may be substantially in a shape of U. The housing body 102 may be in a shape of a box of which a front side, a rear side, and an upper side open. The housing body 102 may be detachably coupled to the housing cover 103 and/or the housing bracket 104.

The housing body 102 may include a housing inlet 102a through which water enters the filter apparatus 100, and a housing outlet 102b through which water stored in the filter apparatus 100 is discharged from the filter apparatus 100. For example, the housing inlet 102a and/or the housing outlet 102b may be positioned in a lower portion of the housing body 102.

The housing inlet 102a may be connected to the drain hose 74 or 74a of the washing machine 10 or 10a. The housing outlet 102b may be connected to a drain line 105.

The housing cover 103 may cover the open front side and upper side of the housing body 102. The housing cover 103 may be detachably coupled to the housing body 102 and/or the housing bracket 104. The housing cover 103 may include a cover opening 103a to pass the filter 120 through. The housing cover 103 may include an installation portion 103b at which a user interface 197 is installed. At least one portion of the user interface 197 may be exposed to the outside of the filter apparatus 100 through the installation portion 103b.

The housing bracket 104 may cover the open rear side of the housing body 102. The housing bracket 104 may be detachably coupled to the housing body 102 and/or the housing cover 103. The housing bracket 104 may include a cable opening 104a to pass a power cable 109 through. The housing bracket 104 may include a connector installation portion 104b to which a connector 108 for communicating with an external device including the washing machine 10, etc., is connectable.

The filter apparatus 100 may include a filter case 110 positioned inside the filter housing 101. The filter case 110 may form a flow path through which water entered into the filter apparatus 100 passes. The filter case 110 may accommodate the filter 120. For example, the filter case 110 may include a case body 111 and a case cover 112.

The case body 111 may extend along the extension direction of the filter 120 accommodated therein. The case body 111 may include a case opening 111a to pass the filter 120 through. The case opening 111a may correspond to the cover opening 103a. The case opening 111a may be positioned closer to the case outlet 111b than a case inlet 112a and pass the filter 120 through.

The case body 111 may include the case outlet 111b for discharging water that has entered the filter case 110 from the filter case 110. The case outlet 111b may be positioned in a lower portion of the case body 111. The case outlet 111b may be adjacent to the case opening 111a. The case outlet 111b may be close to another end of the filter 120, being opposite to one end of the filter 120 at which a filter opening 120a is positioned. The case outlet 111b may be closer to a second filter portion 122 of the filter 120 than a first filter portion 121 of the filter 120.

The case outlet 111b may be connected to the housing outlet 102b. The filter apparatus 100 may include a discharge guide 107 for connecting the case outlet 111b to the housing outlet 102b. For example, the case outlet 111b may be integrated into the discharge guide 107. For example, the case outlet 111b, the discharge guide 107, and the housing outlet 102b may be integrated into one body.

The case cover 112 may be detachably coupled to another end of the case body 111, being opposite to one end of the case body 111 at which the case opening 111a is positioned. For example, the case cover 112 may be integrated into the case body 111.

The case cover 112 may include the case inlet 112a through which water enters the filter case 110. The case inlet 112a may be connected to the housing inlet 102a. The filter apparatus 100 may include an inlet guide 106 for connecting the case inlet 112a to the housing inlet 102a. For example, the case inlet 102a may be integrated into the inlet guide 106. For example, the case inlet 112a, the inlet guide 106, and the housing inlet 102a may be integrated into one body.

The case cover 112 may include a motor installation portion 112b for installing a filter cleaning device 130. The motor installation portion 112b may be positioned above the case inlet 112a. A cleaning motor 136 of the filter cleaning device 130 may be installed at the motor installation portion 112b.

The filter apparatus 100 may include the filter 120 that is detachably coupled to the filter case 110. The filter 120 may filter foreign materials having fine sizes. The filter 120 may filter microplastics having sizes of about 5 mm or less. The filter 120 may include a mesh filter. The filter 120 may extend substantially between the case inlet 112a and the case outlet 111b.

The filter 120 may include the filter opening 120a that opens toward the case inlet 112a upon installation in the filter case 110. Water entered into the filter case 110 through the case inlet 112a may move to the inside of the filter 120 through the filter opening 120a.

The filter 120 may include the first filter portion 121 and the second filter portion 122. The first filter portion 121 may be closer to the case inlet 112a than the second filter portion 122. Foreign materials of water entered into the filter case 110 may be filtered in the first filter portion 121, or may pass through the first filter portion 121 without being filtered in the first filter portion 121 and then be filtered in the second filter portion 122. The first filter portion 121 and the second filter portion 122 may be positioned sequentially along the extension direction of the filter 120. Foreign materials transferred from the first filter portion 121 by the filter cleaning device 130 may be collected in the second filter portion 122.

The filter apparatus 100 may include a handle 129 of which at least one portion is exposed to outside of the filter housing 101 upon installation of the filter 120 in the filter case 110. The handle 129 may be detachably coupled to the filter 120. Because the handle 129 is detachably coupled to the filter 120, the filter 120 may be easily maintained and repaired. The handle 129 may be coupled to the cover opening 103a and/or the case opening 111a by rotating.

The filter apparatus 100 may include the filter cleaning device 130 for cleaning the filter 120. The filter cleaning device 130 may be installed in the filter case 110. The filter cleaning device 130 may include a cleaning member 131 for cleaning a surface of the filter 120 through which foreign materials are filtered. The filter cleaning device 130 may include a cleaning driver 135 for driving the cleaning member 131.

The cleaning member 131 may be positioned inside the filter 120. The cleaning member 131 may correspond to the first filter portion 121 of the filter 120. The cleaning member 131 may include a blade 131a extending in a spiral shape. The blade 131a may extend in a radial direction from a rotating shaft of the cleaning member 131. The cleaning member 131 may be in contact with the surface of the filter 120 through which foreign materials are filtered. The cleaning member 131 may be in contact with an inner surface of the filter 120. For example, the cleaning member 131 may include a plurality of brushes.

While the cleaning member 131 is driven by the cleaning driver 135, the cleaning member 131 may transfer foreign materials filtered in a portion of the filter 120 being close to the case inlet 112a to another portion of the filter 120 being close to the case outlet 111b. The cleaning member 131 may transfer foreign materials filtered in the first filter portion 121 to the second filter portion 122. For example, the cleaning member 131 may be rotatably provided inside the filter 120. The cleaning member 131 may include a flexible material. The cleaning member 131 may clean foreign materials filtered in the filter 120 while rotating in a state of being in contact with the filter 120. While the cleaning member 131 is driven in the state of being in contact with the filter 120, the cleaning member 131 may remove foreign materials attached on the surface of the filter 120 through which foreign materials are filtered, by raking out the foreign materials. For example, the cleaning member 131 may be slidable inside the filter 120.

For example, an external diameter of the cleaning member 131 may be greater than an internal diameter of the filter 120. For example, an external diameter of the blade 131a may be greater than the internal diameter of the filter 120. While the cleaning member 131 overlaps with the filter 120 upon driving of the filter cleaning device 130, the cleaning member 131 may more effectively clean foreign materials collected in the filter 120. The cleaning member 131 may effectively remove foreign materials attached on the surface of the filter 120 through which foreign materials are filtered.

The cleaning member 131 may transfer foreign materials filtered in the first filter portion 121 to the second filter portion 122, and while water entered into the filter case 110 flows from the first filter portion 121 to the second filter portion 122, the foreign materials filtered in the first filter portion 121 may be efficiently collected in the second filter portion 122.

The cleaning driver 135 may include the cleaning motor 136. The cleaning driver 135 may include a motor shaft 137. The cleaning motor 136 may generate power for driving the cleaning member 131. The motor shaft 137 may be connected to the cleaning member 131. The cleaning motor 136 may be installed in the filter case 110. The cleaning motor 136 may be closer to the case inlet 112a than the case outlet 111b.

The filter apparatus 100 may include a circuitry 190 positioned inside the filter housing 101. The circuitry 190 may be positioned at an upper end area inside the filter housing 101. The circuitry 190 may be positioned to one side of the filter case 110. For example, the circuitry 190 may be positioned above the filter case 110. For example, the circuitry 190 may be positioned above the filter 120.

Figure 21:
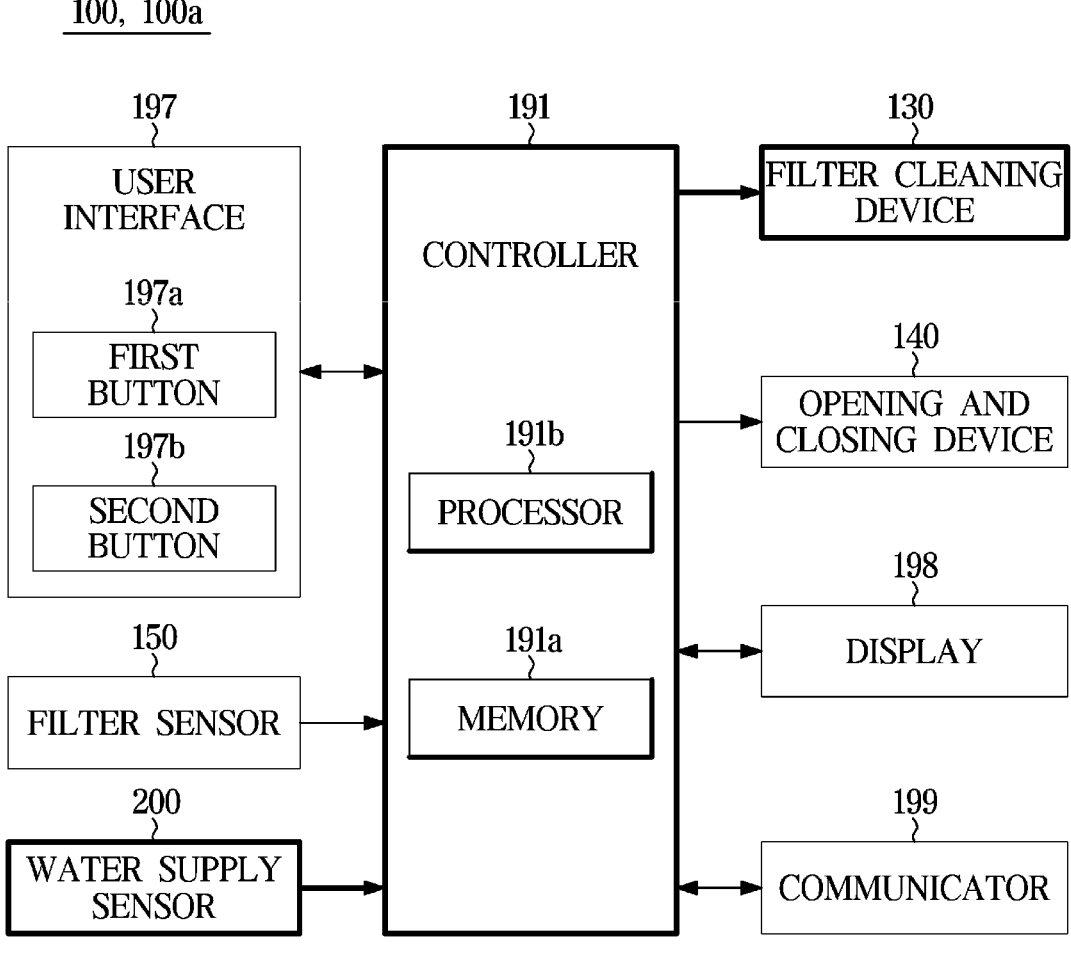
FIG. 21 is a control block diagram of a filter apparatus according to an embodiment of the disclosure.

In the circuitry 190, a controller 191 for controlling the filter apparatus 100 may be provided (see FIG. 21). In the circuitry 190, a communicator 199 for communicating with the washing machine 10 or 10a may be provided (see FIG. 21).

The filter apparatus 100 may include the user interface 197 positioned on the circuitry 190. At least one portion of the user interface 197 may be exposed to the outside of the filter apparatus 100 through the installation portion 103b of the filter housing 101. The user interface 197 may be positioned on an upper surface of the filter apparatus 100. The user interface 197 may include at least one of a first button 197a or a second button 197b. The first button 197a may include at least one of a power button or a WiFi connection button. The second button 197b may include another one of the power button or the WiFi connection button, which is different from the first button 197a.

The filter apparatus 100 may include a display 198 for displaying visualized information related to the filter apparatus 100. The display 198 may be positioned on an upper surface of the filter apparatus 100. For example, the display 198 may be provided as a component of the user interface 197.

The filter apparatus 100 may include a filter sensor 150 for obtaining information about a state of the filter 120. The filter sensor 150 may be installed on the filter case 110. The filter sensor 150 may be positioned on an outer surface of the filter case 110. The filter sensor 150 may be positioned to correspond to the second filter portion 122 of the filter 120 installed in the filter case 110. For example, the filter sensor 150 may include a magnetic sensor. For example, the filter sensor 150 may include an optical sensor. The filter sensor 150 may also be referred to as a sensor 150.

The filter apparatus 100 may include a water supply sensor 200 for detecting supply of water to the filter apparatus 100. The water supply sensor 200 may be referred to as a sensor 200. Details about the water supply sensor 200 will be described below.

Referring to FIG. 9, the filter case 110 may include a remaining water guide 119 formed to guide remaining water existing in the filter case 110. The remaining water guide 119 may be positioned below the filter 120 in a direction of gravity. For example, the remaining water guide 119 may be inclined downward toward the case inlet 112a from the case outlet 111b. The remaining water guide 119 may be inclined with a preset angle g with respect to a direction that is perpendicular to the direction of gravity. The remaining water guide 119 may prevent water remaining in the filter case 110 from being discharged to the outside of the filter apparatus 100 through the case outlet 111b.

A location of a lower end of a port of the case outlet 111b in the direction of gravity may be higher than a location of a lower end of the case inlet 112a in the direction of gravity. Remaining water existing in the filter case 110 may move from around the case outlet 111b toward the case inlet 112a by gravity. For example, a bottom of the filter case 110 between the port of the case outlet 111b and the case inlet 112a may include a step portion.

The case inlet 112a may be positioned below the filter 120. An uppermost end of the case inlet 112a in the direction of gravity may be positioned below an uppermost end of the filter 120 in the direction of gravity. A lowest end of the case inlet 112a in the direction of gravity may be positioned below a lowest end of the filter 120 in the direction of gravity. The port of the case outlet 111b may be positioned below the filter 120.

The filter case 110 may include a connecting opening 118. The connecting opening 118 may be positioned at one end of the remaining water guide 119, which is close to the case inlet 112a. The connecting opening 118 may be formed in the filter case 110 to discharge water guided by the remaining water guide 119 toward the case inlet 112a. The connecting opening 118 may be formed in the filter case 110 to guide water received through the case inlet 112a to a bypass flow path 117 which will be described below.

The filter apparatus 100 may include an opening and closing device 140 for opening or closing the connecting opening 118. The opening and closing device 140 may include a connecting door 141 and a door motor 142 for operating the connecting door 141.

The connecting door 141 may open or close the connecting opening 118. The connecting door 141 may have a size and/or shape capable of closing the connecting opening 118. The connecting door 141 may be rotatably coupled to the filter case 110. The connecting door 141 may be rotatable in a direction in which water flows from the remaining water guide 119 to the case inlet 112a. The connecting door 141 may be rotatable in an opposite direction of a direction in which water received through the case inlet 112a flows to the connecting opening 118. The connecting door 141 may prevent the connecting opening 118 from opening by pressure of water received through the case inlet 112a.

The door motor 142 may generate power for operating the connecting door 141. The opening and closing device 140 may include a power transfer device 143 for transferring power generated in the door motor 142 to the connecting door 141. Power generated in the door motor 142 may be transferred to the connecting door 141 through the power transfer device 143.

Inside the filter case 110, a filtering flow path 116 passing through the filter 120 and the bypass flow path 117 bypassing the filter 120 may be formed. Water received through the case inlet 112a may move to the case outlet 111b through the filtering flow path 116, or to the case outlet 111b through the bypass flow path 117.

While the connecting door 141 opens the connecting opening 118, water received through the case inlet 112a may move directly to the bypass flow path 117 without passing through the filtering flow path 116. Water received through the case inlet 112a may enter the bypass flow path 117 through the connecting opening 118 and then be discharged to the outside of the filter case 110 through the case outlet 111b. Accordingly, although a portion of the filter 120 is clogged, water may be discharged from the filter apparatus 100. Therefore, the filter apparatus 100 may be prevented from stopping.

While the connecting door 141 opens the connecting opening 118, water of the bypass flow path 117 may move directly to the case inlet 112a without passing through the filtering flow path 116. Remaining water existing in the filter case 110 may move toward the case inlet 112a through the connecting opening 118, and then be discharged to the outside of the filter case 110 through the case inlet 112a. Accordingly, remaining water generated in the filter apparatus 100 may be easily processed.

The connecting opening 118 may enable water of the bypass flow path 117 to move to the case inlet 112a or water entered into the case inlet 112a to move to the bypass flow path 117.

Water entered into the filter apparatus 100 through the housing inlet 102a may be guided to the filter case 110 by the inlet guide 106. Water entered into the filter case 110 through the case inlet 112a may enter the inside of the filter 120 through the filter opening 120a. Water entered into the filter case 110 may flow to the filtering flow path 116. Because the connecting door 141 closes the connecting opening 118, water entered into the filter case 110 may not flow to the bypass flow path 117 through the connecting opening 118. Foreign materials of water entered into the inside of the filter 120 may be filtered as the water passes through the filter 120. Water passed through the filter 120 may be discharged to the outside of the filter case 110 through the case outlet 111b. The water discharged through the case outlet 111b may pass through the discharge guide 107 and the housing outlet 102b sequentially and be discharged from the filter apparatus 100. The water discharged from the filter apparatus 100 may be guided through the drain line 105.

While water is no longer supplied to the filter apparatus 100, remaining water may be disposed inside the filter case 110. The remaining water may be stored in the bottom of the filter case 110 by gravity. The remaining water may be stored in the bypass flow path 117.

According to openness of the connecting opening 118 by the connecting door 141, the remaining water stored in the bottom of the filter case 110 may flow to the case inlet 112a. The remaining water flowing to the case inlet 112a may pass through the inlet guide 106 and the housing inlet 102a sequentially and be discharged to the outside of the filter apparatus 100. The remaining water discharged to the outside of the filter apparatus 100 may be guided to the drain device 70 or 70a of the washing machine 10 or 10a by the drain hose 74 or 74a.

Meanwhile, the filter case 110 may include a first space S1 and a second space S2. The filter 120 may be installed in the first space S1. The second space S2 may accommodate water received through the case inlet 112a and flowing toward the first space S1. The second space S2 may collect water entered into the inside of the filter case 110 and not yet passing through the filter 120. For example, the second space S2 may be positioned below the first space S1. For example, the second space S2 may be defined by the lowest end L of the filter 120, the connecting door 141, and the case inlet 112a in a state in which the connecting door 141 closes the connecting opening 118.

Referring to FIGS. 6 and 8, the filter apparatus 100 may include a water supply sensor 200. The water supply sensor 200 may detect supply of water to the filter apparatus 100. The water supply sensor 200 may detect water entered into the filter apparatus 100 from the drain device 70 or 70a of the washing machine 10 or 10a.

For example, the water supply sensor 200 may detect at least one among presence or absence of water entered into the filter apparatus 100, a rate of flow of water entered into the filter apparatus 100, a rate of flow of water flowing inside the filter apparatus 100, or a water level of water accommodated in the filter apparatus 100. For example, water entered into the filter apparatus 100 may include at least one among water entered into the filter housing 101, water entered into the housing inlet 102a of the filter housing 101, water entered into the filter case 110, water entered into the case inlet 112a of the filter case 110, or water entered into the inlet guide 106. The water supply sensor 200 may detect water entered into various components of the filter apparatus 100 in addition to the above-mentioned examples.

For example, during a drain operation of the washing machine 10 or 10a, water stored in the tub 20 may be discharged to the outside of the washing machine housing 11 or 11a by the drain device 70 or 70a. The water discharged to the outside of the washing machine housing 11 or 11a may enter the filter apparatus 100 via the drain hose 74 or 74a. Foreign materials of the water discharged from the washing machine 10 or 10a by the drain operation of the washing machine 10 or 10*a* may be filtered as the water passes through the filter apparatus 100. At this time, the water supply sensor 200 may detect the water discharged from the washing machine 10 or 10*a* and moving toward the filter apparatus 100.

For example, the water supply sensor 200 may be various kinds of sensors. The water supply sensor 200 may be a noncontact sensor. The water supply sensor 200 may detect water entered into the filter apparatus 100 without any physical contact to water. The water supply sensor 200 may be a contact sensor. The water supply sensor 200 may detect water entered into the filter apparatus 100 through a physical contact to water. A kind of the water supply sensor 200 is not limited as long as the water supply sensor 200 is capable of detecting water entered into the filter apparatus 100 from the drain device 70 or 70*a* of the washing machine 10 or 10*a* by a drain operation of the washing machine 10 or 10*a*.

Figure 10:
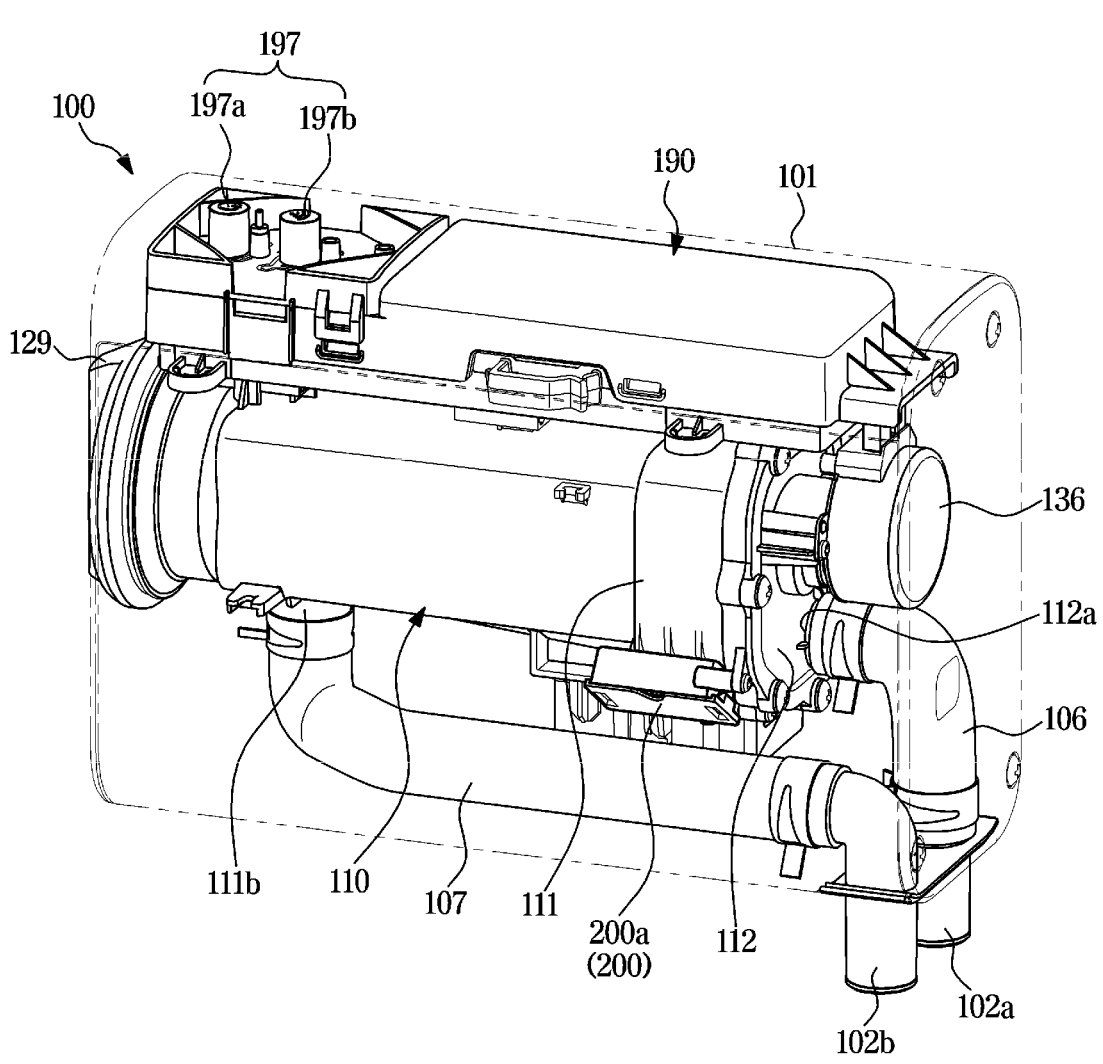
FIG. 10 shows a filter apparatus including a first sensor according to an embodiment of the disclosure.
Figure 11:
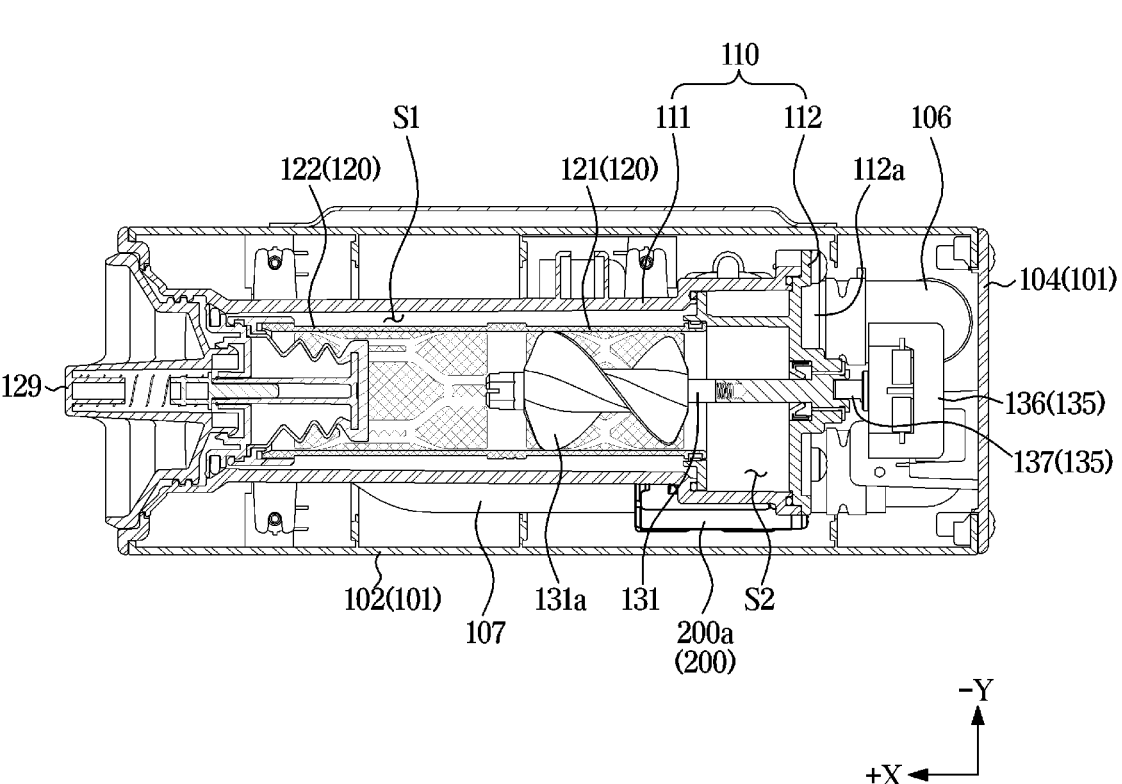
FIG. 11 is a top view of the filter apparatus shown in FIG. 10 according to an embodiment of the disclosure.

FIG. 10 shows a filter apparatus including a first sensor according to an embodiment of the disclosure. FIG. 11 is a top view of the filter apparatus shown in FIG. 10.

An example in which the filter apparatus 100 includes a first sensor 200*a* will be described with reference to FIGS. 10 and 11. The first sensor 200*a* may be an example of the water supply sensor 200.

The filter apparatus 100 may include the first sensor 200*a*. The first sensor 200*a* may be a noncontact sensor. The first sensor 200*a* may detect water entered into the filter apparatus 100 without any physical contact to water.

The first sensor 200*a* may be detachably mounted on the outer surface of the filter case 110 to detect water accommodated inside the filter case 110.

For example, the first sensor 200*a* may be mounted on the outer surface of the filter case 110, corresponding to the second space S2. For example, the first sensor 200*a* may detect water accommodated in the second space S2. For example, the first sensor 200*a* may detect a case in which water entered into the filter case 110 reaches a preset water level inside the filter case 110. For example, the first sensor 200*a* may detect a case in which a water level of water accommodated in the filter case 110 is equal to or higher than a height of the lowest end L of the filter 120.

For example, the first sensor 200*a* may include a capacitive sensor. For example, the first sensor 200*a* may include a capacitor and detect a change of charging and discharging cycles of the capacitor, although not limited thereto. However, the first sensor 200*a* may detect water entered into the filter apparatus 100 without any physical contact to water by various methods.

FIGS. 10 and 11 show a case in which the first sensor 200*a* is mounted on the outer surface of the filter case 110, although not limited thereto. For example, the first sensor 200*a* may be detachably mounted on the outer surface of the housing inlet 102*a* of the filter housing 101. For example, the first sensor 200*a* may be detachably mounted on the outer surface of the inlet guide 106. The first sensor 200*a* is not limited in position as long as the first sensor 200*a* is capable of detecting water entered into the filter apparatus 100 from the drain device 70 or 70*a* of the washing machine 10 or 10*a*.

Figure 12:
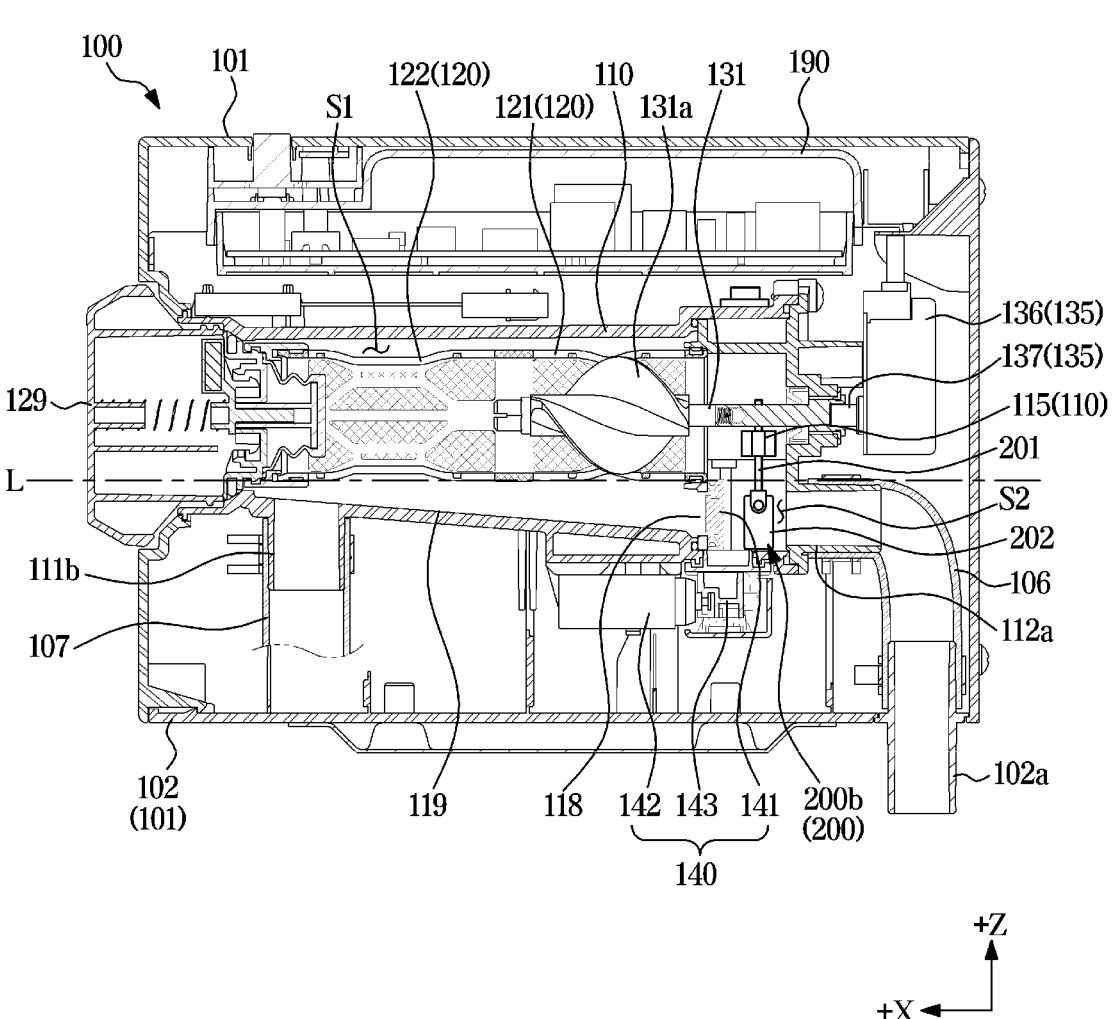
FIG. 12 shows a cross section of a filter apparatus including a second sensor according to an embodiment of the disclosure.
Figure 13:
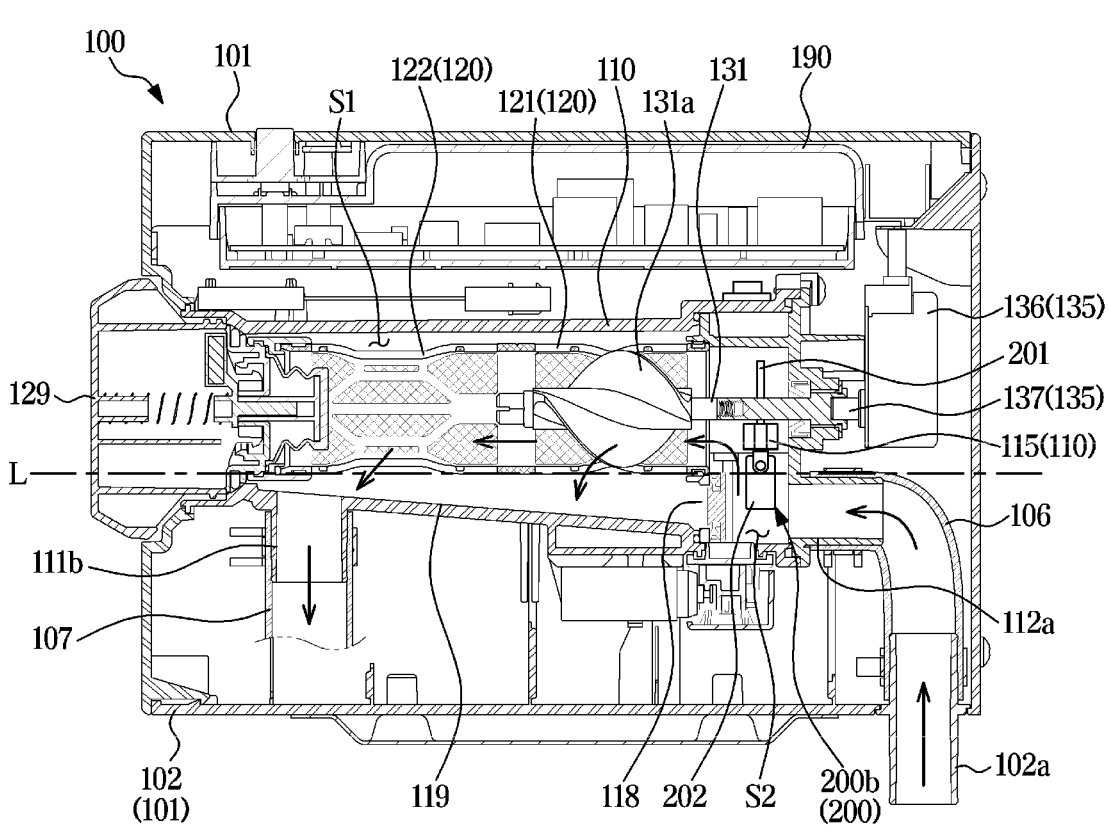
FIG. 13 shows a state in which the second sensor has moved according to reception of water by the filter apparatus shown in FIG. 12 according to an embodiment of the disclosure.
Figure 13:
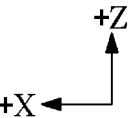

FIG. 12 shows a cross section of a filter apparatus including a second sensor according to an embodiment of the disclosure. FIG. 13 shows a state in which the second sensor has moved according to reception of water by the filter apparatus shown in FIG. 12.

An example in which the filter apparatus 100 includes a second sensor 200*b* will be described with reference to FIGS. 12 and 13. The second sensor 200*b* may correspond to an example of the water supply sensor 200.

The filter apparatus 100 may include the second sensor 200*b*. The second sensor 200*b* may be a contact sensor. The second sensor 200*b* may detect water entered into the filter apparatus 100 through a physical contact to water.

The second sensor 200*b* may be detachably installed inside the filter case 110 to detect water accommodated in the filter case 110.

For example, at least one portion of the second sensor 200*b* may be positioned in the second space S2. For example, the second sensor 200*b* may detect water entered into the second space S2 through the case inlet 112*a*. For example, the second sensor 200*b* may detect a case in which water entered into the filter case 110 reaches a preset water level inside the filter case 110. For example, the second sensor 200*b* may detect a case in which a water level of water accommodated in the filter case 110 is equal to or higher than a height of the lowest end L of the filter 120.

For example, the second sensor 200*b* may include a float 202. At least one portion of the float 202 may be positioned in the second space S2, and float by water entered into the second space S2 through the case inlet 112*a*. For example, the second sensor 200*b* may include a stem 201 extending from the float 202. According to filling of water in the second space S2, the float 202 may move along an extension direction of the stem 201. For example, the float 202 may be movable in an up-down direction. For example, the float 202 may include a magnet, and the stem 201 may include a switch. According to floating of the float 202, the magnet of the float 202 may turn on or off the switch of the stem 201.

For example, a stem fixing portion 115 for fixing the stem 201 may be provided inside the filter case 110. The stem fixing portion 115 may restrict the stem 201 with respect to a circumferential direction of the stem 201. The stem fixing portion 115 may not restrict the stem 201 with respect to the extension direction of the stem 201. Accordingly, the float 202 may move along the extension direction of the stem 201 by water entered into the second space S2.

Figure 14:
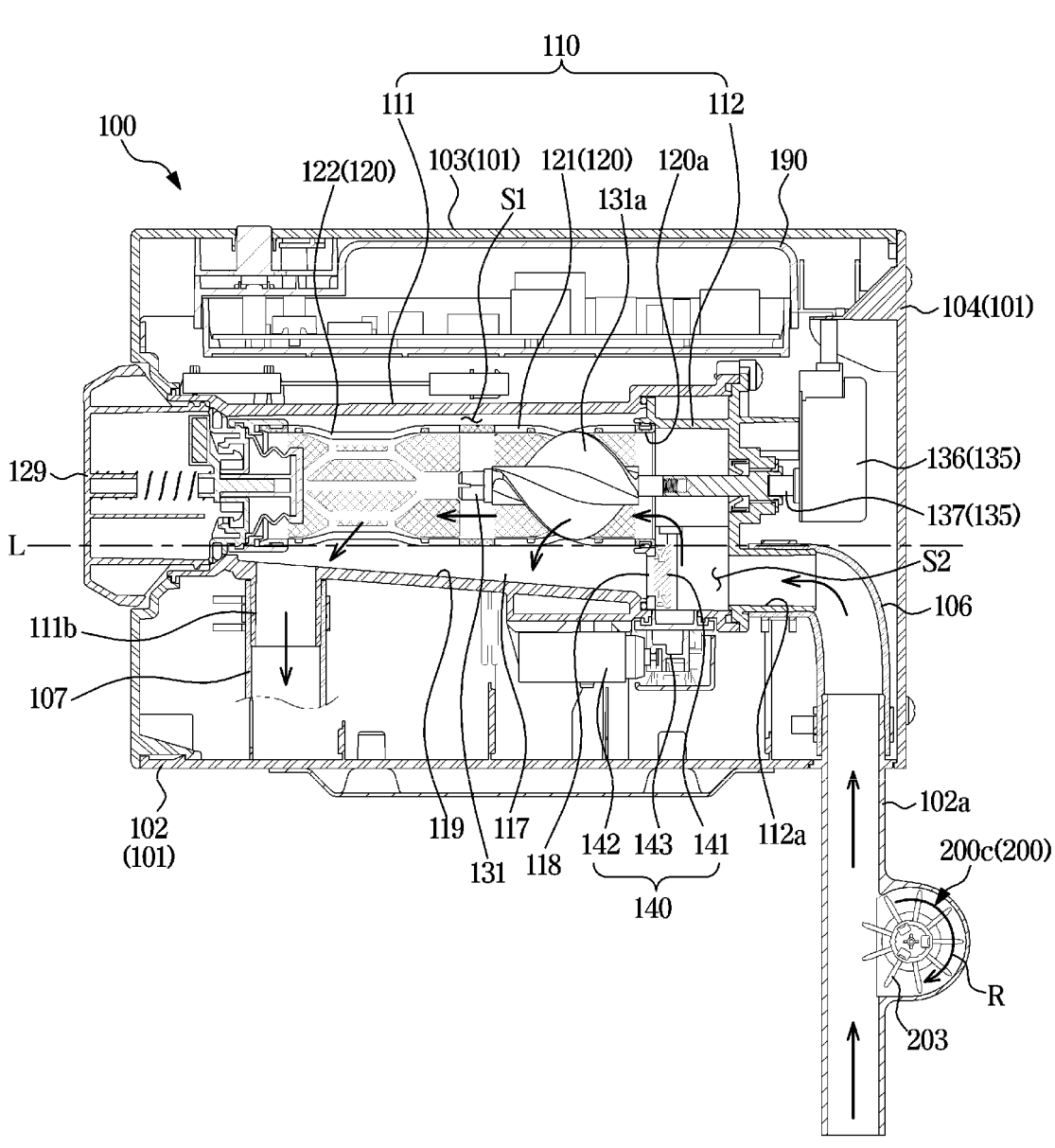
FIG. 14 shows a cross section of a filter apparatus including a third sensor according to an embodiment of the disclosure.

FIG. 14 shows a cross section of a filter apparatus including a third sensor according to an embodiment of the disclosure.

An example in which the filter apparatus 100 includes a third sensor 200*c* will be described with reference to FIG. 14. The third sensor 200*c* may correspond to an example of the water supply sensor 200.

The filter apparatus 100 may include the third sensor 200*c*. The third sensor 200*c* may be a contact sensor. The third sensor 200*c* may detect water entered into the filter apparatus 100 through a physical contact to water.

The third sensor 200*c* may detect water entered into the filter apparatus 100. The third sensor 200*c* may detect water passing through at least one component of the filter apparatus 100. The third sensor 200*c* may detect a rate of flow of water entered into the filter apparatus 100.

For example, the third sensor 200*c* may be detachably installed in the housing inlet 102*a* of the filter housing 101. For example, the third sensor 200*c* may detect a rate of flow of water passing through the housing inlet 102*a*.

For example, the third sensor 200*c* may include a rotating body 203. The rotating body 203 may be rotatable by water entered into the filter apparatus 100. The rotating body 203 may rotate by water passing through the housing inlet 102*a*.

For example, the rotating body 203 may include a magnet. According to a rotation of the rotating body 203, magnetism of the magnet included in the rotating body 203 may change. According to the change of the magnetism of the magnet included in the rotating body 203, a sensor output of the third sensor 200c may also change. The third sensor 200c may detect at least one among presence or absence of water rotating the rotating body 203, velocity of water rotating the rotating body 203, or a rate of flow of water rotating the rotating body 203, based on the sensor output.

FIG. 14 shows a case in which the third sensor 200c is installed in the housing inlet 102a, although embodiments are not limited thereto. For example, the third sensor 200c may be detachably installed in the inlet guide 106. In this case, the rotating body 203 of the third sensor 200c may detect water passing through the inlet guide 106. For example, the third sensor 200c may be detachably installed in the case inlet 112a of the filter case 110. In this case, the third sensor 200c may detect water passing through the case inlet 112a. For example, the third sensor 200c may be detachably installed in the second space S2. In this case, the third sensor 200c may detect water passing through the second space S2. The third sensor 200c is not limited in position as long as the third sensor 200c is capable of detecting a flow of water entering the filter apparatus 100 from the drain device 70 or 70a of the washing machine 10 or 10a.

Figure 15:
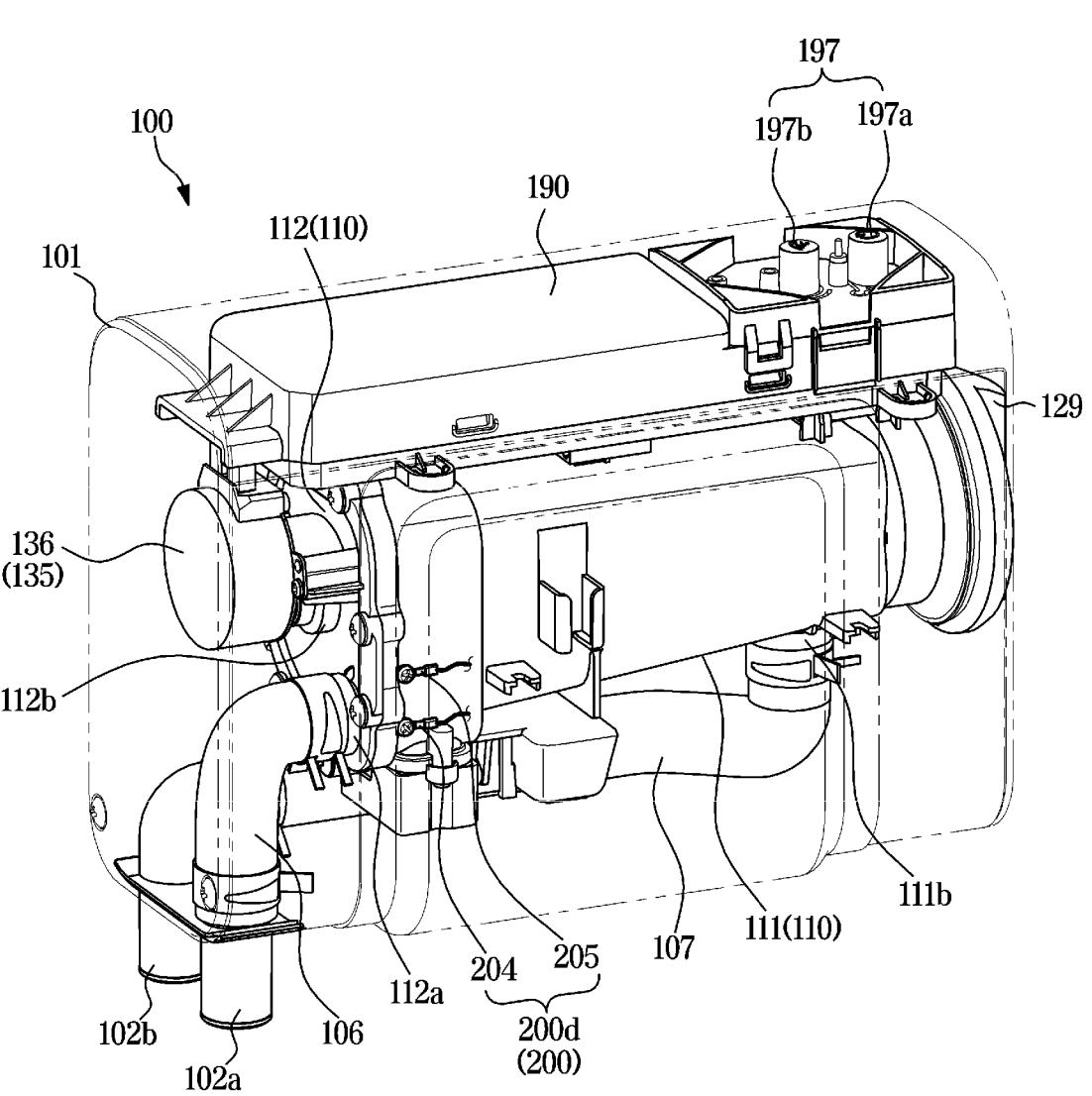
FIG. 15 shows a filter apparatus including a fourth sensor according to an embodiment of the disclosure.
Figure 16:
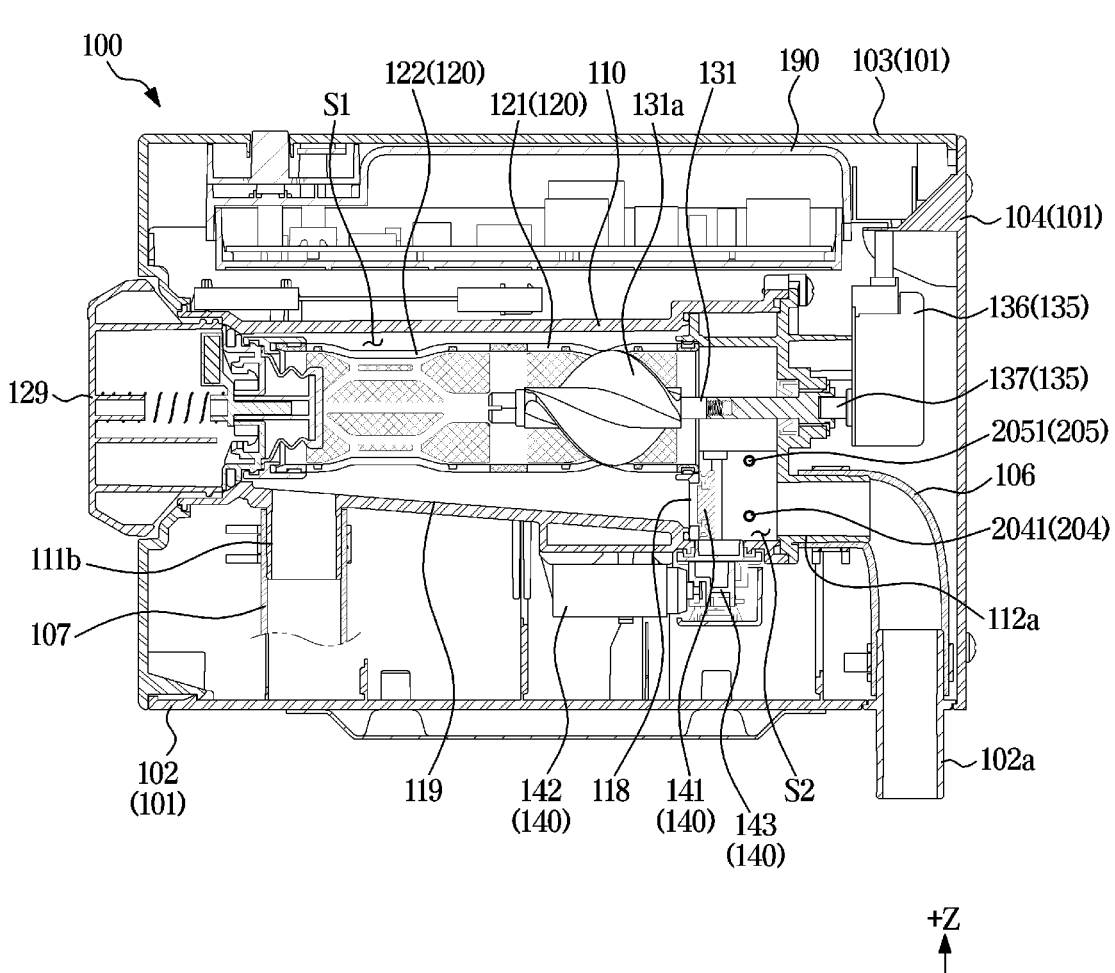
FIG. 16 shows a cross section of the filter apparatus shown in FIG. 15 according to an embodiment of the disclosure.
Figure 17:
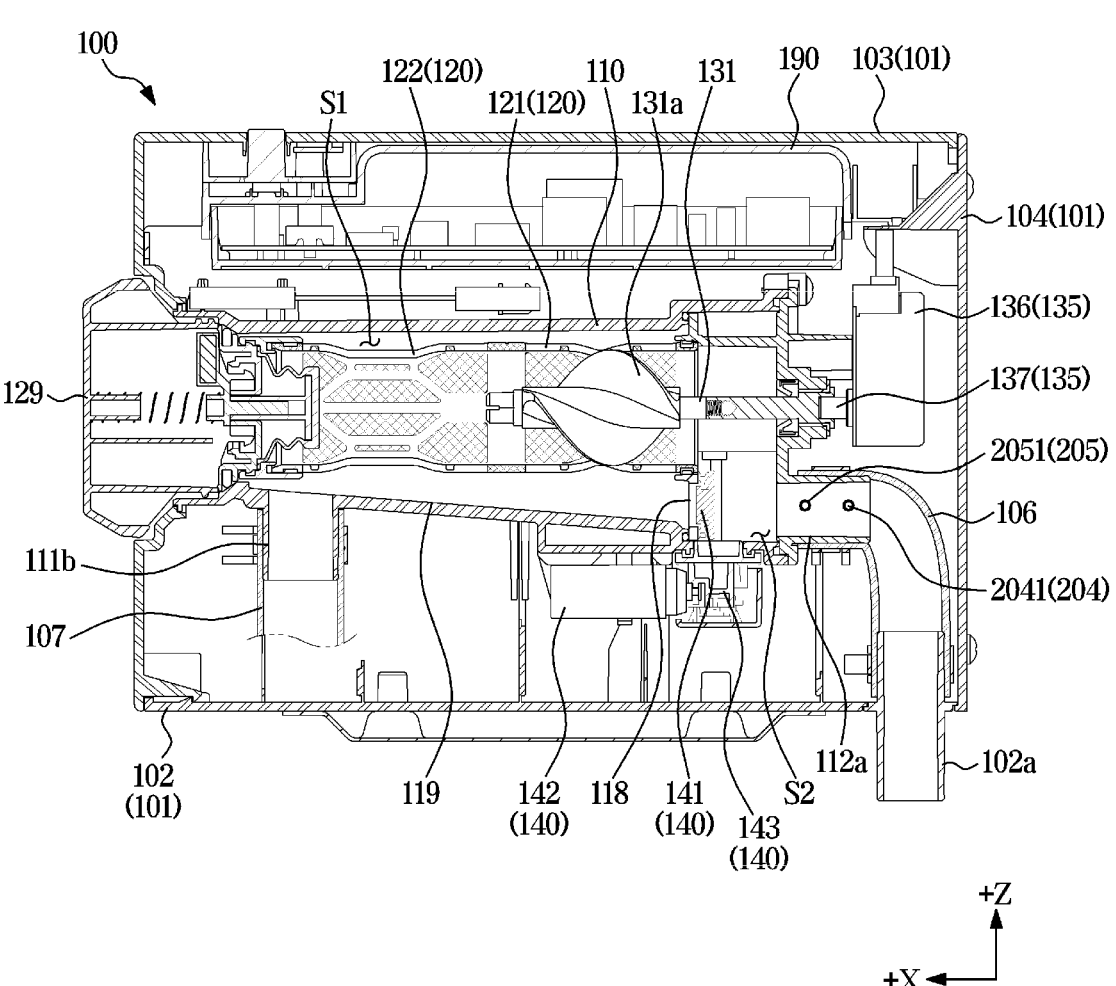
FIG. 17 shows a cross section of a filter apparatus in which the fourth sensor shown in FIG. 16 is provided at a location that is different from a location in FIG. 16 according to an embodiment of the disclosure.
Figure 18:
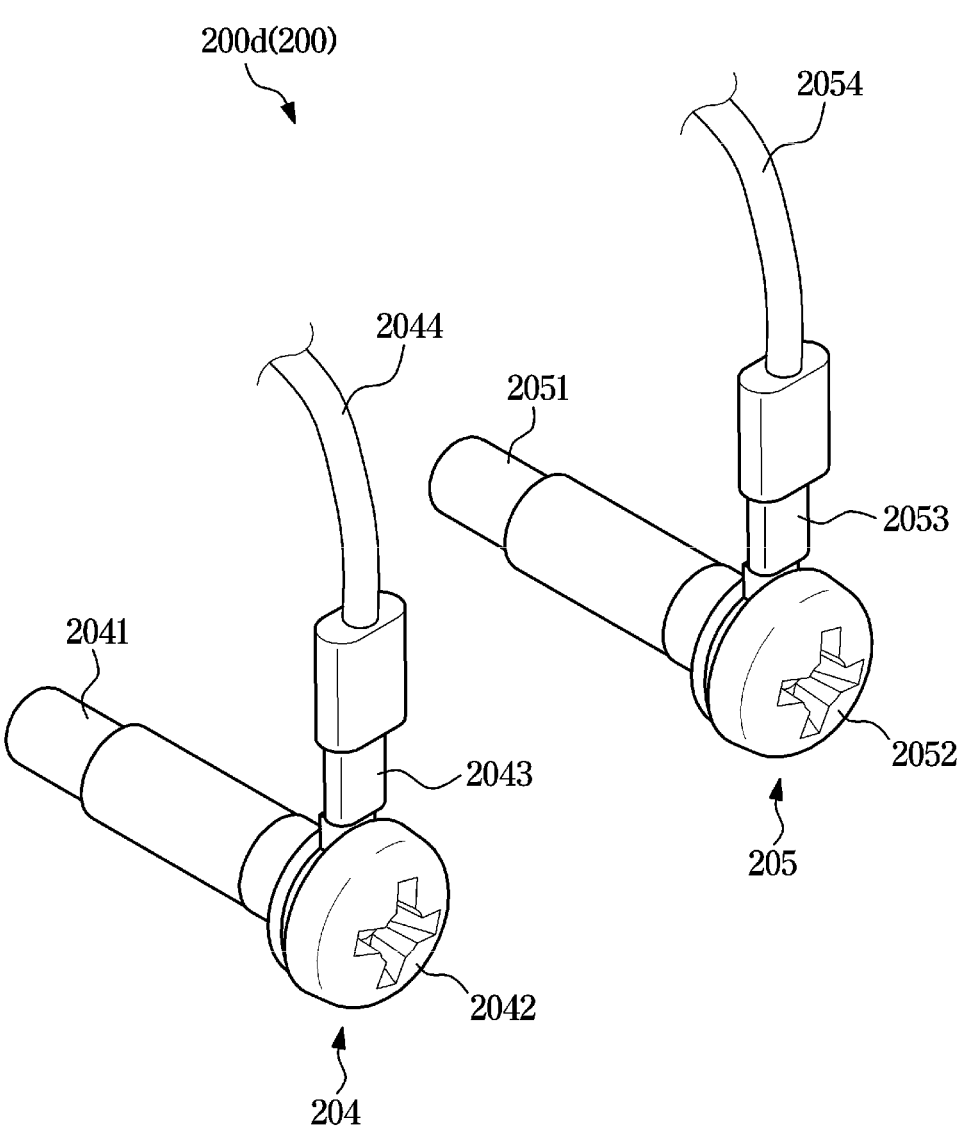
FIG. 18 shows a fourth sensor according to an embodiment of the disclosure.

FIG. 15 shows a filter apparatus including a fourth sensor according to an embodiment of the disclosure. FIG. 16 shows a cross section of the filter apparatus shown in FIG. 15. FIG. 17 shows a cross section of a filter apparatus in which the fourth sensor shown in FIG. 16 is provided at a location that is different from a location in FIG. 16. FIG. 18 shows a fourth sensor according to an embodiment of the disclosure.

An example in which the filter apparatus 100 includes a fourth sensor 200d will be described with reference to FIGS. 15 to 18. The fourth sensor 200d may correspond to an example of the water supply sensor 200.

The filter apparatus 100 may include the fourth sensor 200d. The fourth sensor 200d may be a contact sensor. The fourth sensor 200d may detect water entered into the filter apparatus 100 through a physical contact to water.

The fourth sensor 200d may be detachably installed in the filter case 110. The fourth sensor 200d may detect water accommodated in the filter case 110. The fourth sensor 200d may detect water entered into the filter case 110. The fourth sensor 200d may detect water passing through at least one component of the filter apparatus 100.

The fourth sensor 200d may include a first electrode portion 2041 and a second electrode portion 2051. A pair of the first electrode portion 2041 and the second electrode portion 2051 may be provided. The fourth sensor 200d may detect conduction between the first electrode portion 2041 and the second electrode portion 2051. The fourth sensor 200d may detect a short circuit between the first electrode portion 2041 and the second electrode portion 2051. For example, upon a contact of the first electrode portion 2041 and the second electrode portion 2051 to water, current may flow between the first electrode portion 2041 and the second electrode portion 2051. The fourth sensor 200d may identify that water enters the filter apparatus 100 based on the current.

For example, referring to FIG. 16, the first electrode portion 2041 and the second electrode portion 2051 of the fourth sensor 200d may be positioned inside the filter case 110. For example, the first electrode portion 2041 may be positioned in the second space S2, and the second electrode portion 2051 may be spaced a preset distance from the first electrode portion 2041. For example, the fourth sensor 200d may detect water entered into the second space S2 through the case inlet 112a and moving toward the first space S1.

For example, referring to FIG. 17, the first electrode portion 2041 and the second electrode portion 2051 of the fourth sensor 200d may be positioned inside the filter case 110. For example, the first electrode portion 2041 may be positioned in the case inlet 112a, and the second electrode portion 2051 may be spaced a preset distance from the first electrode portion 2041. For example, the fourth sensor 200d may detect water passing through the case inlet 112a.

The fourth sensor 200d may be positioned at a location that is different from that shown in FIGS. 15 to 17. For example, any one of the first electrode portion 2041 and the second electrode portion 2051 may be positioned in the second space S2, and another one of the first electrode portion 2041 and the second electrode portion 2051 may be positioned in the case inlet 112a. For example, both the first electrode portion 2041 and the second electrode portion 2051 may be positioned in the inlet guide 106. For example, any one of the first electrode portion 2041 and the second electrode portion 2051 may be positioned in the inlet guide 106, and another one of the first electrode portion 2041 and the second electrode portion 2051 may be positioned in the case inlet 112a. For example, any one of the first electrode portion 2041 and the second electrode portion 2051 may be positioned in the inlet guide 106, and another one of the first electrode portion 2041 and the second electrode portion 2051 may be positioned in the housing inlet 112a. For example, both the first electrode portion 2041 and the second electrode portion 2051 may be positioned in the housing inlet 102a, although not limited to the above-described example. The fourth sensor 200d is not limited in position as long as the fourth sensor 200d is capable of detecting water entered into the filter apparatus 100 from the drain device 70 or 70a of the washing machine 10 or 10a.

For example, referring to FIG. 18, the fourth sensor 200d may include a first electrode unit 204 and a second electrode unit 205.

The first electrode unit 204 may include the first electrode portion 2041 for detecting water. For example, the first electrode portion 2041 may include an electrode bar from which a sheath has been peeled off. The first electrode portion 2041 may be in contact with water. The first electrode portion 2041 may be exposed to inside of the filter case 110, inside of the inlet guide 106, or inside of the housing inlet 102a.

The first electrode unit 204 may include a first fixing portion 2042 fixed to the filter apparatus 100. The first fixing portion 2042 may be provided at one side of the first electrode portion 2041. The first fixing portion 2042 may be mounted on the outer surface of the filter case 110, an outer surface of the inlet guide 106, or an outer surface of the housing inlet 102a.

The first electrode unit 204 may include a first sensor cable 2044. The first sensor cable 2044 may be electrically connected to the circuitry 190.

The first electrode unit 204 may include a holder 2043 provided to support the first sensor cable 2044.

The second electrode unit 205 may include the second electrode portion 2051 for detecting water. For example, the second electrode portion 2051 may include an electrode bar from which a sheath has been peeled off. The second electrode portion 2051 may be in contact with water. The second electrode portion 2051 may be exposed to the inside of the filter case 110, the inside of the inlet guide 106, and the inside of the housing inlet 102a.

The second electrode unit 205 may include a second fixing portion 2052 fixed to the filter apparatus 100. The second fixing portion 2052 may be provided at one side of the second electrode portion 2051. The second fixing portion 2052 may be positioned on the outer surface of the filter case 110, the outer surface of the inlet guide 106, and the outer surface of the housing inlet 102a.

The second electrode unit 205 may include a second sensor cable 2054. The second sensor cable 2054 may be electrically connected to the circuitry 190.

The second electrode unit 205 may include a holder 2053 for supporting the second sensor cable 2054.

Figure 19:
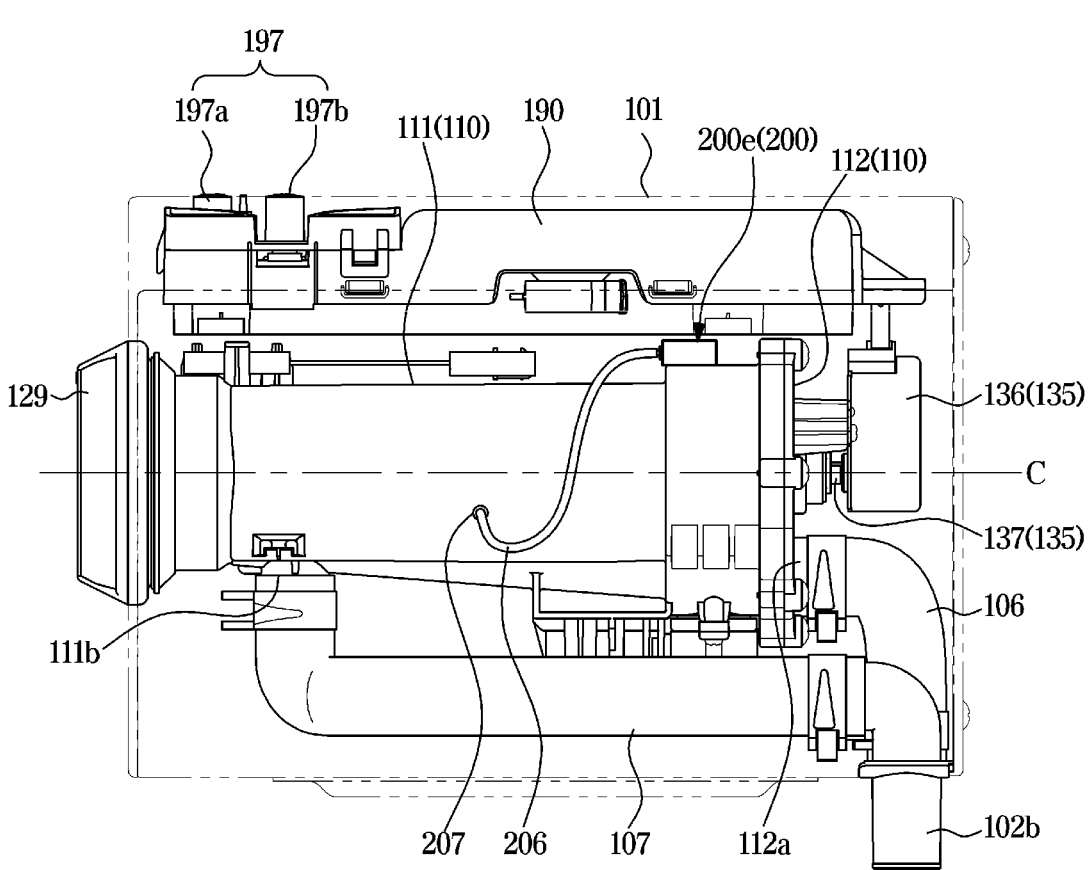
FIG. 19 shows a side surface of a filter apparatus including a fifth sensor according to an embodiment of the disclosure.

FIG. 19 shows a side surface of a filter apparatus including a fifth sensor according to an embodiment of the disclosure.

An example in which the filter apparatus 100 includes a fifth sensor 200e will be described with reference to FIG. 19. The fifth sensor 200e may correspond to an example of the water supply sensor 200.

The filter apparatus 100 may include the fifth sensor 200e. The fifth sensor 200e may be provided inside the filter apparatus 100.

The fifth sensor 200e may detect a water level of water in the filter case 110. For example, the fifth sensor 200e may detect a water level of water flowing inside the filter case 110. For example, the fifth sensor 200e may detect a water level of water accommodated in the filter case 110.

The filter apparatus 100 may include the connecting tube 206. The connecting tube 206 may extend from the filter case 110. The connecting tube 206 may move water existing in the filter case 110. One end of the connecting tube 206 may communicate with the filter case 110. The one end of the connecting tube 206 may be connected to a communicating opening 207 formed in the filter case 110. Another end of the connecting tube 206 may be connected to the fifth sensor 200e. Water existing inside the filter case 110 may flow to the connecting tube 206 through the communicating opening 207. Water discharged from the filter case 110 through the communicating opening 207 may be filled in the connecting tube 206. According to a change of a water level inside the filter case 110, internal pressure of the connecting tube 206 may change.

The fifth sensor 200e may detect a change in internal pressure of the connecting tube 206. For example, the fifth sensor 200e may include a ferrite core and a coil wound around the ferrite core. For example, according to a change in internal pressure of the connecting tube 206, the ferrite core may move and an inductance value of the coil may change. According to the change of the inductance value of the coil, an output frequency of the fifth sensor 200e may change. As a result, the fifth sensor 200e may detect a water level of water existing in the filter case 110 based on the output frequency.

For example, the communicating opening 207 may be positioned below a center line C. For example, the fifth sensor 200e may be positioned above the center line C of the filter 120. The center line C may be a line passing through a center of the filter 120 along the extension direction of the filter 120.

The connecting tube 206 and the fifth sensor 200e may be referred to as a sensing device.

Meanwhile, the examples 200a, 200b, 200c, 200d, and 200e of the water supply sensor 200, as described above with reference to FIGS. 10 to 18, may be combined with each other.

Figure 20:
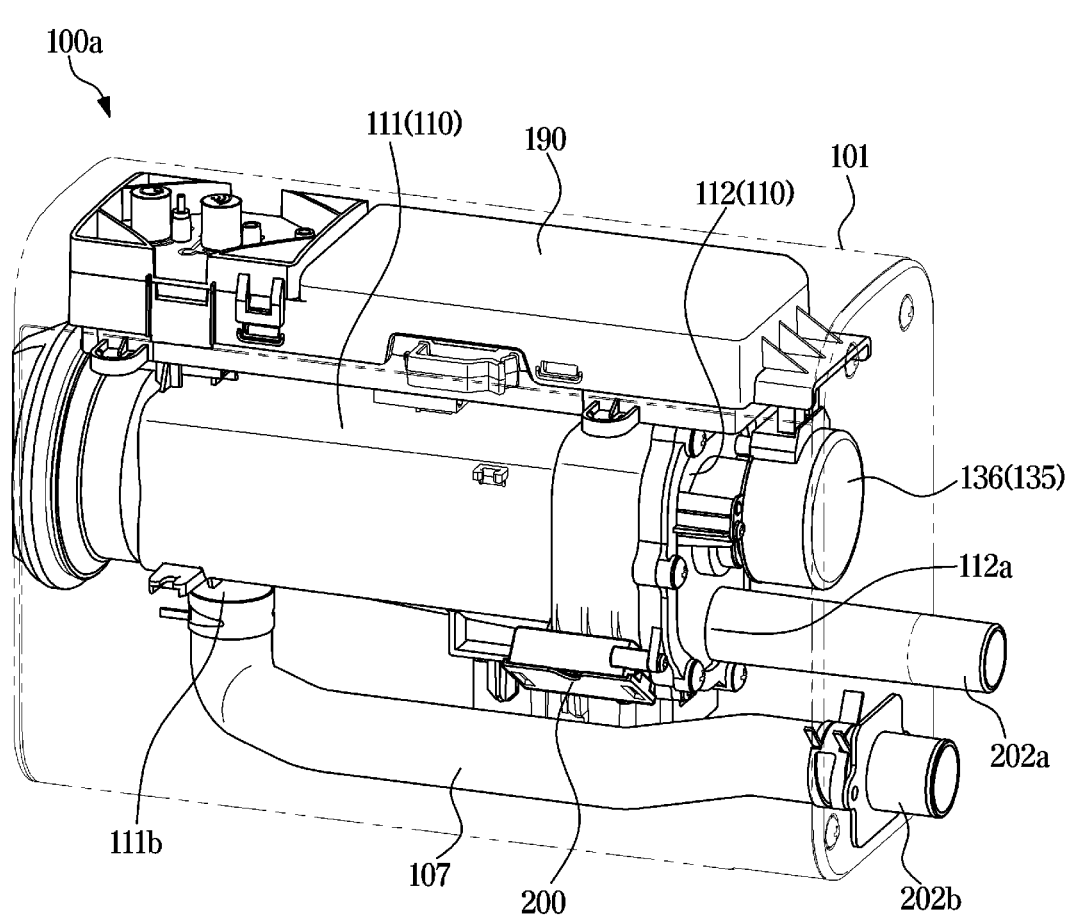
FIG. 20 shows a filter apparatus according to an embodiment of the disclosure.

FIG. 20 shows a filter apparatus according to an embodiment of the disclosure.

A filter apparatus 100a according to an embodiment of the disclosure will be described with reference to FIG. 20. In the following descriptions about the filter apparatus 100a shown in FIG. 20, the same components as those of the filter apparatus 100 shown in FIGS. 6 to 9 are assigned like reference numerals, and detailed descriptions thereof will be omitted. The examples 200a, 200b, 200c, 200d, and 200e of the water supply sensor 200, as described above with reference to FIGS. 10 to 18, may be applied to the filter apparatus 100a.

Referring to FIG. 20, locations of a housing inlet 202a and a housing outlet 202b of the filter apparatus 100a may be different from locations of the housing inlet 102a and the housing outlet 102b of the filter apparatus 100 shown in FIGS. 6 to 9.

Referring to FIG. 20, the housing inlet 202a may be positioned in a rear surface of the filter apparatus 100a. The housing inlet 202a may be positioned at a housing bracket. The housing inlet 102a of the filter apparatus 100 shown in FIGS. 6 to 9 may be positioned at the housing body 102, whereas the housing inlet 202a of the filter apparatus 100a shown in FIG. 20 may be positioned at the housing bracket. The housing inlet 202a may extend in a substantially same direction as the case inlet 112a of the filter case 110. The housing inlet 202a may be connected directly to the case inlet 112a. For example, the inlet guide 106 may be omitted between the housing inlet 202a and the case inlet 112a. For example, the housing inlet 202a and the case inlet 112a may be integrated into one body.

The housing outlet 202b may be positioned in a rear surface of the filter apparatus 100a. The housing outlet 202b may be positioned at the housing bracket. The housing outlet 102b of the filter apparatus 100 shown in FIGS. 6 to 8 may be positioned at the housing body 102, whereas the housing outlet 202b of the filter apparatus 100a shown in FIG. 20 may be positioned at the housing bracket. Unlike FIG. 20, the housing outlet 202b may be connected directly to a case outlet 111b.

For example, the discharge guide 107 may be omitted between the housing outlet 202b and the case outlet 111b. For example, the housing outlet 202b and the case outlet 111b may be integrated into one body.

In a filter apparatus, the housing inlet 202a shown in FIG. 20 may be combined with the housing outlet 102b shown in FIGS. 6 to 9, and the housing inlet 102a shown in FIGS. 6 to 9 may be combined with the housing outlet 202b shown in FIG. 20, which is not shown.

FIG. 21 is a control block diagram of a filter apparatus according to an embodiment of the disclosure. FIG. 21 schematically shows a flow of signals between components of the filter apparatus according to an embodiment of the disclosure.

Referring to FIG. 21, the filter apparatus 100 or 100a according to an embodiment of the disclosure may include the user interface 197 for interactions with a user, the filter sensor 150, the water supply sensor 200, the filter cleaning device 130, the opening and closing device 140, the display 198, the communicator 199, and the controller 191 for controlling various components of the filter apparatus 100 or 100a. The filter cleaning device 130 may include the cleaning motor 136. The opening and closing device 140 may include the door motor 142.

The controller 191 may include at least one memory 191a and at least one processor 191b to perform the above-described operations and operations which will be described below.

According to an embodiment of the disclosure, the controller 191 may include at least one memory 191a that stores data in the form of an algorithm and/or program for controlling operations of components in the filter apparatus 100 or 100a, and at least one processor 191b that performs the above-described operations and operations which will be described below by using the data stored in the at least one memory 191a. The memory 191a and the processor 191b may be implemented with separate chips. The processor 191b may include one, two, or more processor chips or one, two, or more processing cores. The memory 191a may include one, two, or more memory chips or one, two, or more memory blocks. Also, the memory 191a and the processor 191b may be implemented with a single chip.

The controller 191 may process a user input received through the user interface 197, and control various components (for example, the filter cleaning device 130, the opening and closing device 140, and the display 198) of the filter apparatus 100 or 100a based on a result of the processing on the user input.

The user interface 197 may include the first button 197a and the second button 197b, and operate based on a control signal from the controller 191.

The filter sensor 150 may detect an amount of foreign materials collected in the filter 120. The filter sensor 150 may transfer a sensing signal to the controller 191. The filter sensor 150 may transfer sensor data to the controller 191. The filter sensor 150 may be mounted on the filter case 110.

The water supply sensor 200 may detect supply of water to the filter apparatus 100 or 100a. The water supply sensor 200 may transfer a sensing signal to the controller 191. The water supply sensor 200 may transfer sensor data to the controller 191. The water supply sensor 200 may be installed in the filter case 110. The water supply sensor 200 may be installed in the case inlet 112a. The water supply sensor 200 may be installed in the inlet guide 106. The water supply sensor 200 may be installed in the housing inlet 102a.

The water supply sensor 200 may include various kinds of sensors. However, the water supply sensor 200 may adopt any configuration capable of detecting supply of water to the filter apparatus 100 or 100a.

The controller 191 may process sensor data received from the filter sensor 150 and/or the water supply sensor 200, and control various components (for example, the filter cleaning device 130 and the opening and closing device 140) of the filter apparatus 100 or 100a based on a result of the processing on the sensor data. It is understood that these various components may be controlled in accordance with a signal produced by the sensors that correspond to, for example, a detected water level in the filter apparatus.

The filter cleaning device 130 may include the cleaning member 131 inserted in the filter 120 in such a way as to be slidable or rotatable with respect to the inner surface of the filter 120, and the cleaning motor 136 for rotating the cleaning member 131.

The controller 191 may control the filter cleaning device 130. For example, the controller 191 may operate or stop the cleaning motor 136.

For example, the controller 191 may control a driving circuit for applying driving current to the cleaning motor 136. The driving circuit may supply driving current to the cleaning motor 136 in response to a driving signal from the controller 191. The driving circuit may include a rectifying circuit for rectifying alternating current power of an external power source, a direct current link circuit for removing ripples from the rectified power and outputting direct current power, an inverter circuit for converting the direct current power into driving power in a form of a sine wave and outputting driving current to the cleaning motor 136, a current sensor for measuring driving current that is supplied to the cleaning motor 136, and a gate driver for turning on/off a switching device included in the inverter circuit based on a driving signal from the controller 191.

The opening and closing device 140 may include the connection door 141 for opening or closing the connecting opening 118, and the door motor 142 for operating the connection door 141.

The controller 191 may control the opening and closing device 140. For example, the controller 191 may control an operation of the door motor 142 to open or close the connecting opening 118.

The display 198 may display visualized information related to the filter apparatus 100 or 100a. For example, the display 198 may be provided as a separate component from the user interface 197. For example, the display 198 may be provided as a component of the user interface 197.

The communicator 199 may transmit data to an external device based on a control signal from the controller 191, or receive data from an external device. For example, the communicator 199 may transmit/receive various data by communicating with a server and/or a user terminal and/or a home appliance including the washing machine 10 or 10a.

For this, the communicator 199 may support establishment of a direct (for example, wired) communication channel or a wireless communication channel with an external electronic device (for example, a server, a user terminal, and/or a home appliance), and communications through an established communication channel. According to an embodiment of the disclosure, the communicator 199 may include a wireless communication module (for example, a cellular communication module, a short-range communication module, or a GNSS communication module) or a wired communication module (for example, a LAN communication module or a power line communication module). A corresponding communication module among the communication modules may communicate with an external electronic device through a first network (for example, a short-range communication network, such as Bluetooth, WiFi Direct, or IrDA) or a second network (for example, a long-range communication network, such as a legacy cellular network, a 5G network, a next-generation communication network, the Internet, or a computer network (for example, a LAN or WAN)). The various kinds of communication modules may be integrated into a single component (for example, a single chip) or implemented with a plurality of separate components (for example, a plurality of chips).

According to various embodiments of the disclosure, the communicator 199 may establish a communication with a user terminal through a server.

According to various embodiments of the disclosure, the communicator 199 may include a WiFi module, and may communicate with an external server and/or a user terminal based on communication establishment with an AP in home.

According to an embodiment of the disclosure, the controller 191 may control the filter cleaning device 130 based on information obtained by the water supply sensor 200. The controller 191 may control an operation of the cleaning driver 135 based on information obtained by the water supply sensor 200. The controller 191 may control an operation of the cleaning motor 136 based on information obtained by the water supply sensor 200. The controller 191 may operate or stop the cleaning motor 136 based on information obtained by the water supply sensor 200.

According to an embodiment of the disclosure, the controller 191 may operate the filter cleaning device 130 based on a detection of a first condition by the water supply sensor 200. The controller 191 may operate the cleaning driver 135 based on a detection of the first condition by the water supply sensor 200. The controller 191 may operate the cleaning motor 136 based on a detection of the first condition by the water supply sensor 200.

For example, the first condition may include a case in which water discharged from the washing machine 10 or 10a enters the filter apparatus 100 or 100a. For example, the first condition may include a case in which water entered into the filter apparatus 100 or 100a reaches a preset water level. For example, the first condition may include a case in which a water level of water accommodated in the filter case 110 is equal to or higher than the height of the lowest end L of the filter 120 or higher. For example, the height of the lowest end L of the filter 120 may be a lowest water level for filtering water entered into the filter apparatus 100 or 100a in the filter 120. In the case in which water accommodated in the filter case 110 reaches the height of the lowest end L of the filter 120, the filter 120 may filter water entered into the filter apparatus 100 or 100a. While the filter 120 filters water entered into the filter apparatus 100 or 100a, the filter cleaning device 130 may clean the filter 120.

According to a detection of the first condition by the water supply sensor 200, the controller 191 may identify that a drain operation of the washing machine 10 or 10a starts. Based on the identification that the drain operation of the washing machine 10 or 10a starts, the controller 191 may operate the filter cleaning device 130. While water discharged from the washing machine 10 or 10a is filtered by the filter 120 of the filter apparatus 100 or 100a, the filter cleaning device 130 may clean the filter 120. Foreign materials collected in the filter 120 may be immediately cleaned by the filter cleaning device 130.

According to an embodiment of the disclosure, the controller 191 may stop operating the filter cleaning device 130 based on a detection of a second condition by the water supply sensor 200. The controller 191 may stop operating the cleaning driver 135 based on the detection of the second condition by the water supply sensor 200. The controller 191 may stop operating the cleaning motor 136 based on the detection of the second condition by the water supply sensor 200.

For example, the second condition may include a case in which supply of water to the filter apparatus 100 or 100a stops. For example, the second condition may include a case in which no water enters the filter apparatus 100 or 100a for a preset time after water is supplied to the filter apparatus 100 or 100a.

For example, the controller 191 may identify that a drain operation of the washing machine 10 or 10a terminates after the drain operation starts, according to a detection of the second condition through the water supply sensor 200. Based on the identification that the drain operation terminates, the controller 191 may stop operating the filter cleaning device 130. In the case in which supply of water discharged from the washing machine 10 or 10a to the filter apparatus 100 or 100a stops, the filter cleaning device 130 may terminate cleaning of the filter 120.

Figure 22:
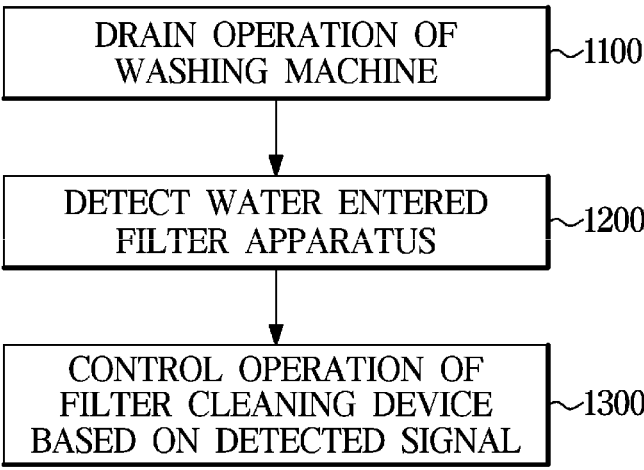
FIG. 22 is a flowchart showing a method for controlling a filter apparatus according to an embodiment of the disclosure.

FIG. 22 is a flowchart showing a method for controlling a filter apparatus according to an embodiment of the disclosure.

Referring to FIG. 22, a drain operation of the washing machine 10 or 10a may be performed (operation 1100). According to a start of the drain operation of the washing machine 10 or 10a, water stored in the tub 20 may be discharged to the outside of the washing machine housing 11 or 11a through the drain hose 74 or 74a. The water discharged from the washing machine 10 or 10a may enter the filter apparatus 100 or 100a.

The water supply sensor 200 may detect the water entered into the filter apparatus 100 or 100a (operation 1200). For example, the water supply sensor 200 may detect at least one among presence or absence of water entered into the filter apparatus 100 or 100a, a flow of water entered into the filter apparatus 100 or 100a, a quantity of water entered into the filter apparatus 100 or 100a, and/or a water level of water accommodated in the filter apparatus 100 or 100a.

The controller 191 may control an operation of the filter cleaning device 130 based on a signal detected by the water supply sensor 200 (operation 1300).

For example, according to a detection of water entered into the filter apparatus 100 or 100a by the water supply sensor 200, the controller 191 may operate the filter cleaning device 130. According to a detection of water entered into the filter apparatus 100 or 100a by the water supply sensor 200, the controller 191 may operate the cleaning driver 135. According to a detection of water entered into the filter apparatus 100 or 100a by the water supply sensor 200, the controller 191 may operate the cleaning motor 136. While water enters the filter apparatus 100 or 100a, the filter cleaning device 130 may clean the filter 120.

For example, the water supply sensor 200 may identify that supply of water to the filter apparatus 100 or 100a stops. In this case, the controller 191 may stop operating the filter cleaning device 130. In the case in which the water supply sensor 200 identifies that supply of water to the filter apparatus 100 or 100a stops, the controller 191 may stop operating the cleaning driver 135. In the case in which the water supply sensor 200 identifies that supply of water to the filter apparatus 100 or 100a stops, the controller 191 may stop operating the cleaning motor 136. In the case in which supply of water to the filter apparatus 100 or 100a stops, the filter cleaning device 130 may stop cleaning the filter 120.

For example, the controller 191 may operate the filter cleaning device 130 based on a detection of at least one of reception of water through a component of the filter apparatus 100 or 100a or collection of water to a preset water level in the filter case 110. For example, the controller 191 may operate the cleaning driver 135 of the filter cleaning device 130 based on a detection of at least one of reception of water through a component of the filter apparatus 100 or 100a or collection of a preset water level of water in the filter case 110. For example, the controller 191 may operate the cleaning motor 136 of the filter cleaning device 130 based on a detection of at least one of reception of water through a component of the filter apparatus 100 or 100a or a preset water level of water collected in the filter case 110.

The flowchart shown in FIG. 22 may be not intended to limit an order of operations 1100, 1200, and 1300, and the order of operations 1100, 1200, and 1300 may change according to various embodiments of the disclosure.

Also, at least two of operations 1100, 1200, and 1300 may be performed simultaneously.

Also, some operations of operations 1100, 1200, and 1300 may be omitted, or another operation not shown in the drawing may be added.

Figure 23:
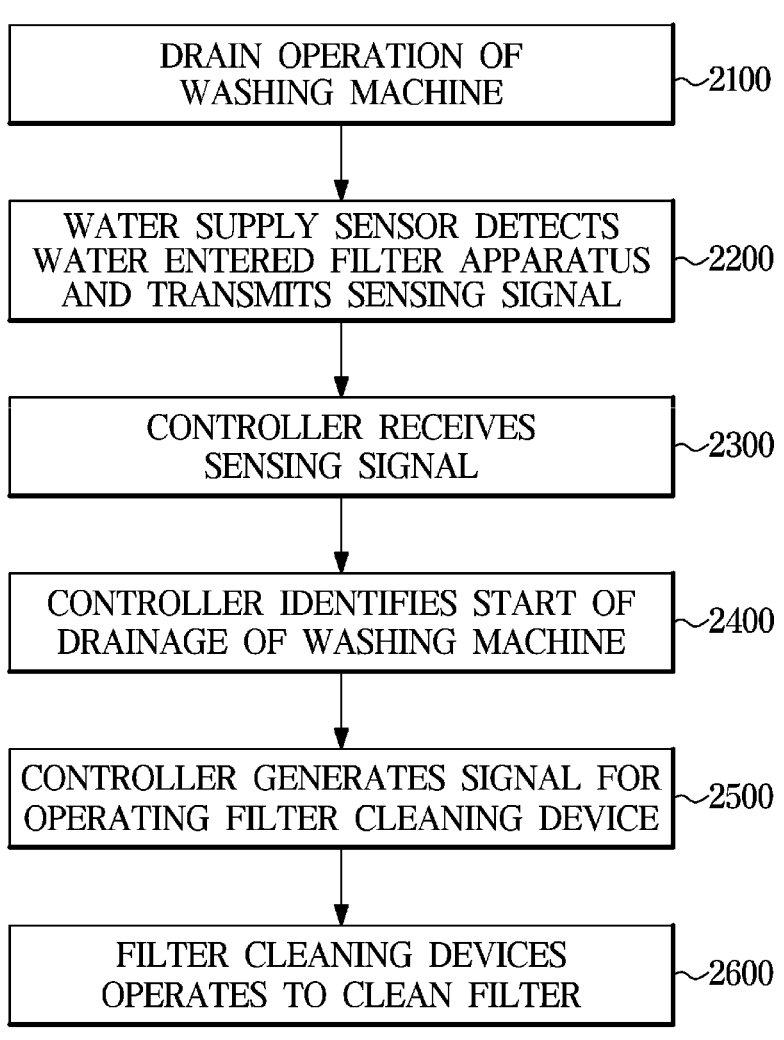
FIG. 23 is a flowchart showing a method for controlling a filter apparatus according to an embodiment of the disclosure.

FIG. 23 is a flowchart showing a method for controlling a filter apparatus according to an embodiment of the disclosure.

Referring to FIG. 23, a drain operation of the washing machine 10 or 10a may be performed (operation 2100).

According to a start of the drain operation of the washing machine 10 or 10a, water stored in the tub 20 may be discharged to the outside of the washing machine housing 11 or 11a through the drain hose 74 or 74a. Water discharged from the washing machine 10 or 10a may enter the filter apparatus 100 or 100a.

The water supply sensor 200 may detect water entered into the filter apparatus 100 or 100a and transmit a sensing signal to the controller 191 (operation 2200). Information obtained through the water supply sensor 200 may be transferred to the controller 191.

The controller 191 may receive the sensing signal from the water supply sensor 200 (operation 2300). The controller 191 may be transferred the sensing signal from the water supply sensor 200.

The controller 191 may identify a start of drainage of the washing machine 10 or 10a based on the sensing signal (operation 2400). The controller 191 may identify whether a drain operation of the washing machine 10 or 10a is performed, based on the sensing signal.

For example, according to an initial detection of a first condition by the water supply sensor 200, the controller 191 may identify that a drain operation of the washing machine 10 or 10a starts. According to a continuous detection of the first condition by the water supply sensor 200, the controller 191 may identify that a drain operation of the washing machine 10 or 10a is in progress. For example, in a case in which the water supply sensor 200 fails to detect the first condition for a preset time after detecting the first condition, the controller 191 may identify that a drain operation of the washing machine 10 or 10a has terminated. For example, according to a detection of a second condition by the water supply sensor 200, the controller 191 may identify that a drain operation of the washing machine 10 or 10a has terminated.

The controller 191 may generate a driving signal for operating the filter cleaning device 130 (operation 2500). For example, the controller 191 may supply power to the filter cleaning device 130 for an operation of the filter cleaning device 130. For example, the controller 191 may apply driving current to the cleaning driver 135. For example, the controller 191 may apply driving current to the cleaning motor 136.

The filter cleaning device 130 may operate by the controller 191 to clean the filter 120 (operation 2600). The filter cleaning device 130 may operate based on the driving signal received from the controller 191. According to the operation of the filter cleaning device 130, foreign materials collected in the filter 120 may be separated from the filter 120. For example, according to the operation of the cleaning motor 136, the blade 131a may rake out foreign materials attached on the inner surface of the filter 120 while rotating.

The flowchart shown in FIG. 23 may be not intended to limit an order of operations 2100, 2200, 2300, 2400, 2500, and 2600, and the order of operations 2100, 2200, 2300, 2400, 2500, and 2600 may change according to various embodiments of the disclosure.

Also, at least two of operations 2100, 2200, 2300, 2400, 2500, and 2600 may be performed simultaneously.

Also, some operations of operations 2100, 2200, 2300, 2400, 2500, and 2600 may be omitted, or another operation not shown in the drawing may be added.

Figure 24:
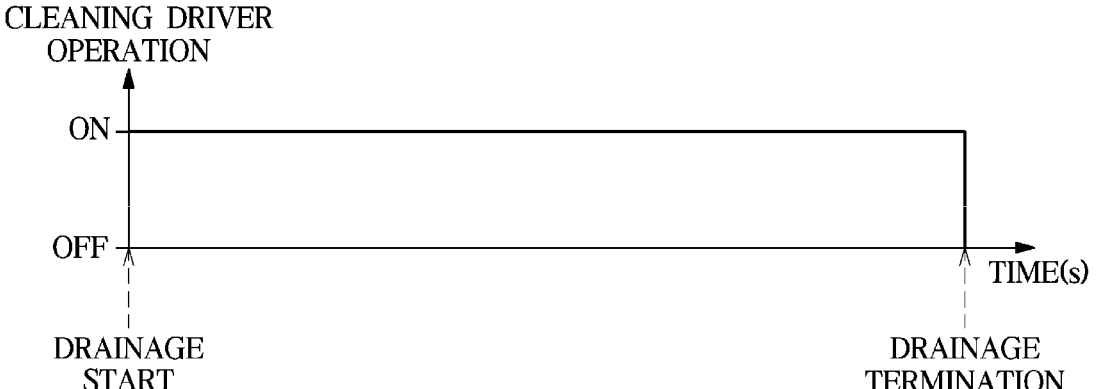
FIG. 24 shows an example of an operation of a filter apparatus according to an embodiment of the disclosure.

FIG. 24 shows an example of an operation of a filter apparatus according to an embodiment of the disclosure.

According to a start of drainage of the washing machine 10 or 10a, the filter cleaning device 130 may operate. In correspondence to the start of drainage of the washing machine 10 or 10a, the cleaning driver 135 may operate. An operation of the filter cleaning device 130 may be controlled by the controller 191. Until the drainage of the washing machine 10 or 10a terminates after the drainage of the washing machine 10 or 10a starts, the cleaning driver 135 may be maintained in an On state. During a drain operation of the washing machine 10 or 10a, the filter 120 may be cleaned by the filter cleaning device 130.

Figure 25:
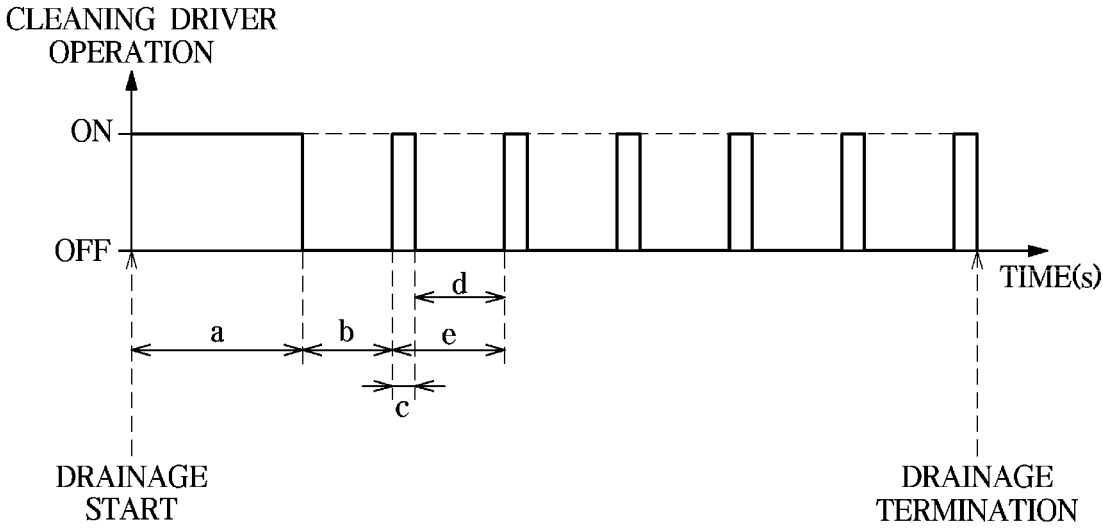
FIG. 25 shows an example of an operation of a filter apparatus according to an embodiment of the disclosure.

FIG. 25 shows an example of an operation of a filter apparatus according to an embodiment of the disclosure.

According to a start of drainage of the washing machine 10 or 10a, the filter cleaning device 130 may operate. In correspondence to the start of drainage of the washing machine 10 or 10a, the filter cleaning device 130 may repeatedly operate and stop. An operation of the filter cleaning device 130 may be controlled by the controller 191. Until drainage of the washing machine 10 or 10a terminates after the drainage starts, the cleaning driver 135 may be repeatedly set to an On state and an Off state.

For example, referring to FIG. 25, according to a start of drainage of the washing machine 10 or 10a, the filter cleaning device 130 may operate for a first time a. After the filter cleaning device 130 operates for the first time a, the filter cleaning device 130 may stop for a second time b. After the filter cleaning device 130 stops for the second time b, the filter cleaning device 130 may operate for a third time c. After the filter cleaning device 130 operates for the third time c, the filter cleaning device 130 may stop for a fourth time d. After the filter cleaning device 130 operates for the first time a and stops for the second time b, the filter cleaning device 130 may operate according to a period of a fifth time e. The fifth time e may be a sum of the third time c and the fourth time d.

For example, the first time a may be longer than the third time c. At an initial stage of a drain operation of the washing machine 10 or 10a, the washing machine 10 or 10a may drain a larger amount of water. Accordingly, after drainage of the washing machine 10 or 10a starts, the filter cleaning device 130 may clean the filter 120 for the first time a which is a relatively long time. Thereafter, a drainage amount of the washing machine 10 or 10 may be reduced, and accordingly, the filter cleaning device 130 may clean the filter 120 for the third time c which is a relatively short time. However, the disclosure is not limited to the above-described example. The first time a and the third time c may be the same time, and the third time c may be longer than the first time a.

The above-described times a, b, c, d, and e may be preset values, and some of the times a, b, c, d, and e may be the same time. The times a, b, c, d, and e may be different times. For example, a user may set the times a, b, c, d, and e through the user interface 197.

Figure 26:
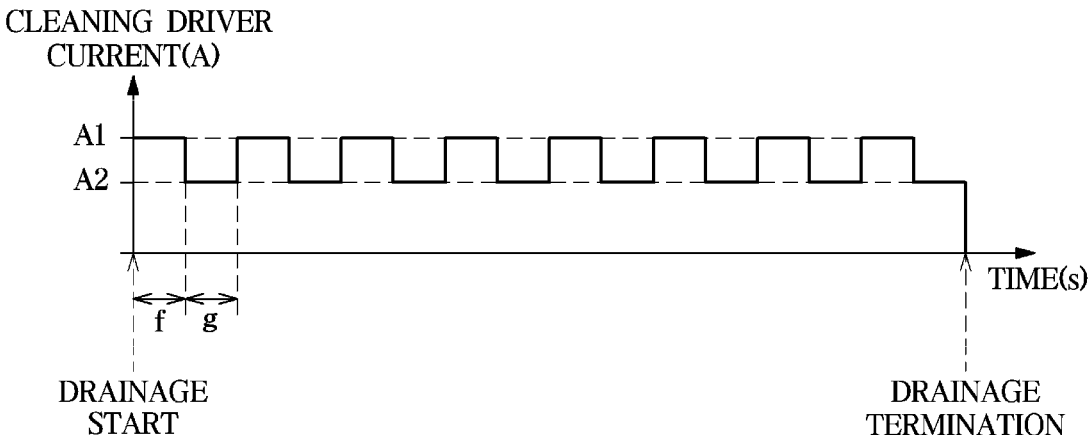
FIG. 26 shows an example of an operation of a filter apparatus according to an embodiment of the disclosure.

FIG. 26 shows an example of an operation of a filter apparatus according to an embodiment of the disclosure.

According to a start of drainage of the washing machine 10 or 10a, the filter cleaning device 130 may operate. Until drainage of the washing machine 10 or 10a terminates after the drainage starts, a magnitude of driving current A that is applied to the cleaning driver 135 may change. The controller 191 may control the driving current A that is supplied to the cleaning driver 135. For example, according to a change in magnitude of the driving current A that is supplied to the cleaning driver 135, an output of the cleaning motor 136 may change. According to the change in output of the cleaning motor 136, a rotation speed of the cleaning member 131 connected to the cleaning motor 136 may change. As a result, a cleaning strength of the filter cleaning device 130 may change.

For example, referring to FIG. 26, according to a start of drainage of the washing machine 10 or 10a, first driving current A1 may be applied to the cleaning driver 135 for a sixth time f. Thereafter, second driving current A2 may be applied to the cleaning driver 135 for a seventh time g. In FIG. 26, the first driving current A1 is shown to be greater than the second driving current A2, although not limited thereto. For example, the second driving current A2 may be greater than the first driving current A1. Also, the sixth time f may be equal to the seventh time g or different from the seventh time g.

The above-described times f and g may be preset values. A user may set the times a, b, c, d, and e through the user interface 197.

FIG. 26 shows an example in which the driving current A of the cleaning driver 135 changes periodically, although not limited thereto. For example, the driving current A of the cleaning driver 135 may change irregularly over time. For example, the driving current A of the cleaning driver 135 may change regularly for a preset period and change irregularly for another preset period.

Meanwhile, a time at which drainage of the washing machine starts, as shown in FIGS. 24 to 26, may be set by the controller 191 of the filter apparatus 100. A time at which drainage of the washing machine terminates, as shown in FIGS. 24 to 26, may be set by the controller 191 of the filter apparatus 100. However, the disclosure is not limited to this. The filter apparatus 100 may receive information about a drainage start time and/or a drainage termination time of the washing machine 10 or 10a by communicating with the washing machine 10 or 10a.

A filter apparatus 100 or 100a according to an embodiment of the disclosure may be positioned outside a washing machine 10 or 10a and connectable to a drain device 70 or 70a of the washing machine 10 or 10a. The filter apparatus 100 or 100a may include a filter case 110 having a case inlet and a case outlet, a filter 120 detachably installed in the filter case, a filter cleaning device 130 including a cleaning driver 135 for cleaning a filter, and a sensor 200 for detecting water entered into the filter apparatus from the drain device. According to the disclosure, because the filter apparatus 100 or 100a is positioned outside the washing machine 10 or 10a, the filter apparatus 100 or 100a may be easily managed. According to the disclosure, because the filter apparatus 100 or 100a includes the filter cleaning device 130, the filter apparatus 100 or 100a may increase a life cycle of the filter 120.

The filter apparatus may further include a controller 191 for controlling an operation of the cleaning driver based on information obtained by the sensor. According to the disclosure, because the filter apparatus 100 or 100a includes the controller 191 for controlling the filter apparatus 100 or 100a, the filter apparatus 100 or 100a may be independently controlled. The filter apparatus 100 or 100a may detect water entered into the filter apparatus 100 or 100a to effectively clean the filter 120. According to the disclosure, cleaning efficiency of the filter 120 may increase.

The controller may operate the cleaning driver based on a detection of a preset condition by the sensor.

The preset condition may include a case in which a water level of water accommodated in the filter case is equal to or higher than a height of a lowest end L of the filter.

The controller may stop operating the cleaning driver based on a detection of a preset condition by the sensor.

The filter case 110 may form a first space S1 in which the filter is installed, and a second space S2 positioned below the first space and accommodating water received through the case inlet and flowing toward the first space.

The sensor 200 may detect at least one of water passing through the case inlet or water accommodated in the second space.

The cleaning driver may include a cleaning motor 136. The filter cleaning device may include a cleaning member 131 that receives power of the cleaning motor and is rotatable while being in contact with a surface of the filter through which foreign materials are filtered.

An external diameter of the cleaning member 131 may be greater than an internal diameter of the filter.

The sensor may be mounted on an outer surface of the filter case, corresponding to the second space, and detect water accommodated in the second space.

The sensor may include a float 202 of which at least one portion is positioned in the second space and which floats by water received through the case inlet.

The sensor may include a rotating body 203 positioned in the case inlet and being rotatable by water passing through the case inlet.

The sensor may include a first electrode portion 2041 positioned in the case inlet, and a second electrode portion 2051 spaced from the first electrode portion, and may detect conduction between the first electrode portion and the second electrode portion.

The sensor may include a first electrode portion 2041 positioned in the second space and a second electrode portion 2051 spaced from the first electrode portion, and may detect conduction between the first electrode portion and the second electrode portion.

The filter apparatus may include a connecting tube 206 of which one end communicates with the filter case and another end is connected to the sensor, to move water existing in the filter case. The sensor may detect a change of internal pressure of the connecting tube.

In a method for controlling the filter apparatus according to an embodiment of the disclosure, the filter apparatus may be positioned outside the washing machine, connectable to a drain device of a washing machine, and include a filter 120, a filter cleaning device 130 including a cleaning driver 135 for cleaning the filter, and at least one sensor 200 for detecting water entering the filter apparatus. The method for controlling the filter apparatus may include controlling the cleaning driver of the filter cleaning device based on a signal detected through the at least one sensor.

The controlling of the cleaning driver may include operating the cleaning driver based on a detection of a preset condition by the at least one sensor.

The controlling of the cleaning driver may include stopping operating the cleaning driver based on a detection of a preset condition by the at least one sensor.

A clothes treating apparatus 1 or 1a according to an embodiment of the disclosure may include a washing machine 10 or 10a and a filter apparatus 100 or 100a. The washing machine may include a washing machine housing, a tub provided inside the washing machine housing, and a drain device for discharging water stored in the tub to outside of the washing machine housing. The filter apparatus may be positioned outside the washing machine housing, and connectable to the drain device of the washing machine. The filter apparatus may include a filter case 110, a filter 120 being detachably installable in the filter case, a filter cleaning device 130 including a cleaning driver 135 configured to clean the filter, a sensor 200 configured to detect water entered into the filter apparatus, and a controller 191 configured to control an operation of the filter cleaning device based on information obtained through the sensor.

The filter case may include: a case inlet 112*a* through which water is received from the drain device; and a case outlet 111*b* through which water passed through the filter is discharged. The controller 191 may operate the cleaning driver 135 of the filter cleaning device 130 based on a detection of reception of water through the case inlet by the sensor or a preset water level of water collected in the filter case.

So far, specific embodiments have been shown and described, however, the disclosure is not limited to these embodiments. It should be interpreted that various modifications may be made by one of ordinary skill in the technical art to which the disclosure belongs, without deviating from the gist of the technical concept of the disclosure, which is defined in the claims.

What is claimed is:

1. A filter apparatus positionable outside a washing machine, the filter apparatus being connectable to a drain device of the washing machine, the filter apparatus comprising:

a filter case including a case inlet and a case outlet;

a filter detachably installable inside the filter case, the filter through which water flowing from the case inlet to the case outlet passes;

a sensor configured to detect the water introduced into the filter apparatus from the drain device and to produce a corresponding signal; and a filter cleaning device configured to clean the filter in accordance with the corresponding signal produced by the sensor, and wherein the sensor includes:

a first electrode portion positioned in the case inlet, wherein the first electrode portion includes a first sensor cable, and a second electrode portion spaced from the first electrode portion, wherein the second electrode portion includes a second sensor cable and wherein the sensor, through the first sensor cable and the second sensor cable, is configured to detect conduction between the first electrode portion and the second electrode portion based on a current produced upon contact of the water to the first electrode portion and the second electrode portion.

2. The filter apparatus of claim 1, further comprising:

a controller configured to control an operation of the filter cleaning device in accordance with the corresponding signal produced by the sensor.

3. The filter apparatus of claim 2, wherein the controller is configured to operate the filter cleaning device based on a detection of a preset condition in accordance with the corresponding signal produced by the sensor.

4. The filter apparatus of claim 2, wherein the controller is configured to stop operating the filter cleaning device based on a detection of a preset condition in accordance with the corresponding signal produced by the sensor.

5. The filter apparatus of claim 3, wherein the preset condition includes a water level in the filter case being equal to or higher than a height of a lowest end of the filter while the filter is installed inside the filter case.

6. The filter apparatus of claim 1, wherein the filter case includes:

a first space in which the filter is installable, and a second space positioned below the first space to accommodate the water received through the case inlet and flowing toward the first space.

7. The filter apparatus of claim 6, wherein the sensor is configured to detect at least one of the water passing through the case inlet or the water accommodated in the second space.

8. The filter apparatus of claim 1, wherein the filter cleaning device includes:

a cleaning driver including a cleaning motor, and a cleaning member configured to be rotatable in contact with a surface of the filter through which foreign materials are filtered while the filter is installed inside the filter case, wherein the cleaning driver is configured to drive rotation of the cleaning member with power generated by the cleaning motor.

9. The filter apparatus of claim 8, wherein an external diameter of the cleaning member is greater than an internal diameter of the filter.

10. The filter apparatus of claim 6, wherein the sensor is mounted on an outer surface of the filter case, corresponding to the second space, wherein the sensor is configured to detect the water accommodated in the second space.

11. The filter apparatus of claim 6, wherein the sensor includes a float configured to float in the water received through the case inlet, at least one portion of the float being positioned in the second space.

12. The filter apparatus of claim 1, wherein the sensor includes a rotating body positioned in the case inlet and the sensor is configured to be rotated by the water passing through the case inlet.

13. The filter apparatus of claim 6, wherein the sensor includes:

a first electrode portion positioned in the second space, and a second electrode portion spaced from the first electrode portion, and the sensor is configured to detect conduction between the first electrode portion and the second electrode portion.

14. The filter apparatus of claim 1, further comprising:

a connecting tube configured to receive the water from the filter case into the connecting tube, wherein a first end of the connecting tube communicates with the filter case, a second end of the connecting tube is connected to the sensor, and the sensor is configured to detect a change of internal pressure of the connecting tube.

* * * * *